US008166403B2

(12) United States Patent  
Torii

(10) Patent No.: US 8,166,403 B2  
(45) Date of Patent: Apr. 24, 2012

(54) NETWORK MANAGEMENT SYSTEM AND NETWORK MANAGEMENT METHOD

(75) Inventor: Minoru Torii, Machida (JP)

(73) Assignee: Canon Kabushiki Kaisha (JP)

(*) Notice: Subject to any disclaimer, the term of this patent is extended or adjusted under 35 U.S.C. 154(b) by 994 days.

(21) Appl. No.: 11/953,423

(22) Filed: Dec. 10, 2007

(65) Prior Publication Data

US 2008/0140822 A1 Jun. 12, 2008

(30) Foreign Application Priority Data

Dec. 11, 2006 (JP) ................................. 2006-333749

(51) Int. Cl.  
*G06F 15/177* (2006.01)  
*G06F 3/00* (2006.01)

(52) U.S. Cl. .......................... 715/734; 715/866; 709/222

(58) Field of Classification Search .................. 715/734, 715/866; 709/222  
See application file for complete search history.

(56) References Cited

U.S. PATENT DOCUMENTS

| | | | | |
|---|---|---|---|---|
| 5,737,518 A * | 4/1998 | Grover et al. ................. | 714/38.1 |
| 5,913,037 A * | 6/1999 | Spofford et al. ............. | 709/226 |
| 5,963,958 A * | 10/1999 | Cottrill ........................ | 1/1 |
| 5,999,179 A * | 12/1999 | Kekic et al. .................. | 715/734 |
| 6,104,868 A * | 8/2000 | Peters et al. ................ | 709/202 |
| 6,122,639 A * | 9/2000 | Babu et al. .................. | 1/1 |
| 6,456,306 B1 * | 9/2002 | Chin et al. .................. | 715/810 |
| 6,546,419 B1 * | 4/2003 | Humpleman et al. ........ | 709/223 |
| 6,615,201 B1 * | 9/2003 | Seshadri et al. ............. | 1/1 |
| 6,985,901 B1 * | 1/2006 | Sachse et al. ............... | 1/1 |
| 7,228,404 B1 * | 6/2007 | Patel et al. .................. | 712/228 |
| 7,257,626 B2 * | 8/2007 | Mokuya et al. .............. | 709/223 |
| 7,743,332 B2 * | 6/2010 | Clark et al. ................. | 715/736 |
| 7,796,534 B1 * | 9/2010 | Arnold et al. ............... | 370/254 |
| 2003/0126195 A1 * | 7/2003 | Reynolds et al. ............ | 709/203 |
| 2006/0179169 A1 * | 8/2006 | Yamada ........................ | 710/8 |
| 2007/0273919 A1 | 11/2007 | Oomura | |

FOREIGN PATENT DOCUMENTS

| | | |
|---|---|---|
| JP | 2000-339259 A | 12/2000 |
| JP | 2001-282655 A | 10/2001 |
| JP | 2005-309617 A | 11/2005 |
| JP | 2006-085643 A | 3/2006 |
| JP | 2006-252023 A | 9/2006 |

OTHER PUBLICATIONS

Japanese Office Action cited in corresponding JP2006-333749, issued Sep. 15, 2011.

* cited by examiner

*Primary Examiner* — William Bashore  
*Assistant Examiner* — David Phantana Angkool  
(74) *Attorney, Agent, or Firm* — Rossi, Kimms & McDowell LLP

(57) ABSTRACT

A network management system which is capable of easily identifying devices, and enhancing the operability of a device management application used by a manager. The network management system includes devices, and a server connected to the devices via a network. The server is configured to be capable of communicating with the devices by SNMPv1, SNMPv3 and SLP. When SNMPv1 can be used for a device, the server acquires device information from the device by SNMPv1. When SNMPv1 cannot be used but SNMPv3 can be used for a device, and an SNMPv3 password is registered, the server acquires device information from the device by SNMPv3. When SNMPv1 cannot be used but SNMPv3 can be used for a device, and a SNMPv3 password is not registered, the server acquires device information from the device by SLP.

19 Claims, 25 Drawing Sheets

FIG.5

DEVICE LIST

DEVICE LIST :

[SELECT ALL] [CANCEL ALL]　　　　　　　　　　　　　　　　　　　　　　　　　　　　　　　　　　　　　　　[OK] [CANCEL] [?]

1-20/152 <FORWARD BACKWARD>

| | IP ADDRESS | DEVICE NAME | INSTALLATION PLACE | NIC NAME | STATUS |
|---|---|---|---|---|---|
| ● | 172.24.12.123 | iR C3200 | 2F ROOM 24 | NB-9F | SHEET RUN OUT |
| ● | 172.24.12.111 | iR C3170 | 2F ROOM 24 | NB-9F | SHEET RUN OUT |
| ● | 172.24.12.100 | LBP-5900 | 3F ROOM 33 | NB-8F | ONLINE |
| ● | 172.24.12.99 | iR C3170 | 3F ROOM 35 | NB-10F | ONLINE |
| ● | 172.24.12.97 | iR C3170 | 1F ROOM 14 | NB-11F | ONLINE |
| ● | 172.24.12.92 | LBP-5900 | 1F ROOM 13 | NB-2F | ONLINE |
| ● | 172.24.12.91 | iR C3170 | 2F ROOM 22 | NB-3F | SERVICE CALL ERROR |
| | | | | | |
| | | | | | |

FIG.7

UNMANAGED SNMPv3 DEVICES

REQUIRED SNMPv3 CREDENTIAL INFORMATION

IT IS DETECTED THAT THE FOLLOWING SNMPv3 DEVICES CANNOT BE MANAGED ON THE NETWORK.

| IP ADDRESS | SOLUTION | USER NAME | AUTHENTICATION PASSPHRASE | PERSONAL PASSPHRASE |
|---|---|---|---|---|
| | SELECT ALL / CANCEL ALL SELECTED | INPUT ALL CREDENTIAL INFORMATION | | |
| 172.24.12.123 | ☑ | initial | ******* | ******* |
| 172.24.12.111 | ☑ | admin | ***** | ********* |
| 172.24.12.100 | ☐ | | | |
| 172.24.12.99 | ☑ | user | ********** | ******* |
| 172.24.12.97 | ☑ | admin2 | ************ | ******* |

FIG.14

DEVICE LIST :

[SELECT ALL] [CANCEL ALL]   [OK] [CANCEL] [?]

| | | IP ADDRESS | DEVICE NAME | INSTALLATION PLACE | SNMP VERSION | STATUS | |
|---|---|---|---|---|---|---|---|
| ☑ | 🖨 | 172.24.12.123 | iR C3200 | 2F ROOM 24 | v1 | SHEET RUN OUT | |
| ☑ | 🖨 | 172.24.12.111 | iR C3170 | | v3 | | Get |
| ☐ | 🖨 | 172.24.12.100 | LBP-5900 | 3F ROOM 33 | v1 | ONLINE | |
| ☑ | 🖨 | 172.24.12.99 | iR C3170 | 3F ROOM 35 | v3 | ONLINE | Update |
| ☑ | 🖨 | 172.24.12.97 | iR C3170 | ▨▨▨ | v3 | ▨▨▨ | Get |
| ☑ | 🖨 | 172.24.12.92 | DEVICE MADE BY COMPANY A | | v3 | | Get |
| ☑ | 🖨 | 172.24.12.91 | DEVICE MADE BY COMPANY B | | v3 | | Get |

1-20/152 <FORWARD BACKWARD>

- MODES 1 AND 2 (172.24.12.123, 172.24.12.111)
- MODE 3 WITH PW REGISTERED (172.24.12.99)
- MODE 3 WITH PW UNREGISTERED (172.24.12.97)

FIG.15

SNMPv3 DEVICE PW REGISTRATION SCREEN

USER NAME : DevMgmtAdmin

AUTHENTICATION PASSWORD : ********

AUTHENTICATION METHOD : MD5 ▽

ENCRYPTION PASSWORD : ********

[REGISTER IN DATABASE]

FIG.19

DEVICE LIST

[SELECT ALL] [CANCEL ALL]

| | IP ADDRESS | DEVICE NAME | INSTALLATION PLACE | SNMP OPERATION MODE | STATUS | |
|---|---|---|---|---|---|---|
| ☑ | 172.24.12.123 | iR C3200 | 2F ROOM 24 | v1 | SHEET RUN OUT | |
| ☑ | 172.24.12.111 | iR C3170 | 1F ROOM 13 | v3 | ONLINE | Get |
| ☐ | 172.24.12.100 | LBP-5900 | 3F ROOM 33 | v1(RO/v3(RW) | ONLINE | |
| ☑ | 172.24.12.99 | iR C3170 | 3F ROOM 35 | v3 | ONLINE | Update |
| ☑ | 172.24.12.97 | iR C3170 | 1F ROOM 12 | v3 | SERVICE CALL ERROR | Get |

1-20/152 <FORWARD BACKWARD>

[OK] [CANCEL] [?]

- MODES 1 AND 2
- MODE 3 WITH PW REGISTERED
- MODE 3 WITH PW UNREGISTERED

FIG.21

DEVICES TO BE MANAGED

STEP 1 ▨ ☐

NUMBER OF DEVICES TO BE MANAGED: (3)

- DEVICE GROUP1
  - iR C 1234
  - iR C 5678
  - iR C 5678

FILTER
- ☑ COLOR MACHINE
- ☑ INSTALLATION PLACE
  - 2F
- ☑ FAX EQUIPPED
- ☑ PAPER DECK EQUIPPED
- ☐ FEEDER EQUIPPED
- ☐ TRIMMER EQUIPPED
- ☐ DOUBLE-SIDED PRINTING POSSIBLE
- ☐ SENDING FUNCTION EQUIPPED
- ☑ INCLUDE SNMPv3 DEVICE

[ OK ] [ CANCEL ]

DEVICE GROUP:

[ CANCEL ALL ] [ SELECT ALL ] [ ADD TO SELECTED OBJECT ]

- ☑ Device Group 1
- ☐ Device Group 2

DEVICE GROUP:

[ CANCEL ALL ] [ SELECT ALL ] [ ADD TO SELECTED OBJECT ]

| | IP ADDRESS | DEVICE NAME | INSTALLATION PLACE | SNMP OPERATION MODE | |
|---|---|---|---|---|---|
| ☑ | 172.24.12.123 | iR C3200 | 2F ROOM 24 | v1 | [Update] |
| ☑ | 172.24.12.111 | iR C3170 | 1F ROOM 13 | v3 | [Get] |
| ☐ | 172.24.12.100 | LBP-5900 | 3F ROOM 33 | v1(RO/V3(RW) | [Get] |
| ☑ | 172.24.12.99 | iR C3170 | 3F ROOM 35 | v3 | |
| ☑ | 172.24.12.97 | iR C3170 | 1F ROOM 12 | v3 | |

FIG.22

DEVICES TO BE MANAGED

STEP 1

NUMBER OF DEVICES TO BE MANAGED: (3)

- DEVICE GROUP1
  - iR C 1234
  - iR C 5678
  - iR C 5678

DEVICE GROUP :

[CANCEL ALL] [SELECT ALL] [ADD TO SELECTED OBJECT]

- ☑ Device Group 1
- ☐ Device Group 2

DEVICE GROUP :

[CANCEL ALL] [SELECT ALL] [ADD TO SELECTED OBJECT]

| | IP ADDRESS | DEVICE NAME | INSTALLATION PLACE | SNMP OPERATION MODE | |
|---|---|---|---|---|---|
| ☑ | 172.24.12.123 | iR C3200 | 2F ROOM 24 | v1 | Update |
| ☑ | 172.24.12.111 | iR C3170 | 1F ROOM 13 | v3 | Get |
| ☐ | 172.24.12.100 | LBP-5900 | 3F ROOM 33 | v1(RO/V3(RW) | |
| ☑ | 172.24.12.99 | iR C3170 | 3F ROOM 35 | v3 | Get |
| ☑ | 172.24.12.97 | iR C3170 | 1F ROOM 12 | v3 | |

FILTER
- ☑ COLOR MACHINE
- ☐ PDL  PCL
- ☑ FAX EQUIPPED
- ☐ DOUBLE-SIDED PRINTING POSSIBLE
- ☐ COLLATE
- ☐ STAPLE
- ☐ FOLDING
- ☐ ENVELOPE PRINTING POSSIBLE
- ☑ INCLUDE SNMPv3 DEVICE

[OK] [CANCEL]

FIG.23

REGISTRATION OF DEVICE SEARCH TASK

Step 1 ▧□□      [ NEXT > ] [ CANCEL ]
SEARCH SETTING

IP BROADCAST SEARCH

☐ PERFORM IP BROADCAST SEARCH OF LOCAL NETWORK
☐ PERFORM IP BROADCAST SEARCH OF DESIGNATED NETWORK
   IP BROADCAST ADDRESS
   [          ▲▼]  [ < ADD ]  [          ]
                   [ DELETE ]

SEARCH OF DESIGNATED IP ADDRESS

☐ SEARCH DESIGNATED IP ADDRESS
   IP ADDRESS : [                ]  [ ADD INPUT VALUE ]
   FILE OF IP ADDRESSES
   IN SEARCH RANGE [          ]  [ REFER ]
                   [ ADD FROM FILE ]
   IP ADDRESS TO BE SEARCHED FOR
   [                    ▲▼]  [ DELETE ]

OPTION

☐ ~~SEARCH STANDARD MIB-COMPATIBLE DEVICE~~
☑ SEARCH SNMPv3 DEVICE    SECURIREBEL [ REBEL 2 ▼ ]
SNMP COMMUNITY NAME TO BE USED
   ⊙ public
   ○ DESIGNATED COMMUNITY NAME
   [              ]  [ ADD INPUT VALUE ]
   COMMUNITY NAME TO BE SEARCHED FOR
   [                    ▲▼]  [ DELETE ]

MULTICAST SEARCH

☑ PERFORM MULTICAST SEARCH
   NUMBER OF ROUTERS TO BE PASSED [ 3    ]
   ⊙ default
   ○ DESIGNATED SCOPE NAME
   [              ]  [ ADD INPUT VALUE ]
   SCOPE NAME TO BE SEARCHED FOR
   [                    ▲▼]  [ DELETE ]

FIG. 24

REGISTRATION OF DEVICE SEARCH TASK

Step 2  ☐▨☐                           [<BACK] [NEXT>] [CANCEL]

TASK SETTING

TASK NAME  [SNMPv3 DEVICE SEARCH TASK]
COMMENT    [                        ]

SEARCH REPETITION PERIOD

○ SEARCH IMMEDIATELY
○ SEARCH ON DESIGNATED DATE/TIME
    EXECUTION DATE/TIME  [2006▽]/[5▽]/[5▽]
                         [23▽]:[00▽]
⊙ SEARCH PERIODICALLY
    EXECUTION REPETITION PERIOD  [EVERY WEEK ▽]
    EXECUTION DAY  ☑ SUN  ☐ MON  ☐ TUE  ☐ WED  ☐ THU  ☐ FRI  ☐ SAT
    EXECUTION TIME  [23▽]:[00▽]

NOTIFICATION OF EXECUTION RESULT

☑ NOTIFY EXECUTION RESULT OF THIS TASK
    MAIL ADDRESS : [admin@abc.com]           [ADD]
    ┌─────────────────────────────────┐
    │ manager_dev1@abc.com            │
    │ manager_supplydev@abc.com       │
    │                                 │
    └─────────────────────────────────┘
                                      [DELETE]

FIG.25

REGISTRATION OF DEVICE SEARCH TASK

Step 3   ☐☐▧                    [<BACK]  [NEXT>]  [CANCEL]

---

TASK SETTING
   TASK NAME        SNMPv3 DEVICE SEARCH TASK 1
   COMMENT

SCHEDULE SETTING
   EXECUTION SCHEDULE             EXECUTE PERIODICALLY
   EXECUTION REPETITION PERIOD     EVERY WEEK
   EXECUTION DAY                    SUN
   START TIME FOR EXECUTION        23:00

NOTIFICATION OF EXECUTION RESULT
   NOTIFY EXECUTION RESULT OF THIS TASK   YES
   NOTIFICATION DESTINATION MAIL ADDRESS   manager_dev1@abc.com
                                                           manager_supplydev@abc.com
                                                           admin@abc.com

DETAILS OF SETTING OF SEVICE SEARCH

---

IP BROADCAST SEARCH
   EARCH LOCAL NETWORK        NO
   SEARCH DESIGNATED NETWORK   NO

SEARCH OF DESIGNATED IP ADDRESS
   SEARCH DESIGNATED IP ADDRESS   NO

OPTION
   SEARCH SNMPv3 DEVICE        YES

MULTICAST SEARCH
   PERFORM MULTICAST SEARCH     YES

NETWORK MANAGEMENT SYSTEM AND NETWORK MANAGEMENT METHOD

BACKGROUND OF THE INVENTION

1. Field of the Invention

The present invention relates to a network management system including a plurality of devices, such as image processing apparatuses, and a management apparatus connected to the devices via a network, and a network management method.

2. Description of the Related Art

As a protocol for managing devices on a network, there has bee proposed SNMPv1 (Simple Network Management Protocol, SNMP version 1).

According to the SNMPv1 network management technique, in a network management system, there are provided at least one network management station (NMS) and a plurality of managed nodes each including an agent. In this case, a network management protocol is necessitated which is used when the network management station and the agents exchange management information with each other. A user can communicate with agent software on the managed nodes using network management software on the NMS, to thereby acquire or change data on the network or change.

The term "agent" is intended to mean software that operates as a background process for each target apparatus. When the user requests management data of the apparatus on the network, the management software puts object identification information in a management packet, and sends the same to a target agent. The agent interprets the object identification information, and takes out data associated with the object identification information, and puts the data in a packet to send it to the user. It should be noted that to take out data, an associated process is sometimes called.

Further, the agent holds data concerning the state of its own in the form of a database. This database is called an MIB (Management Information Base). The MIB has a tree data structure in which all the nodes are uniquely numbered. The identifiers of the nodes are called object identifiers.

The structure of MIB is called an SMI (Structure of Management Information). This structure is defined in RFC1155 "Structure and Identification of Management Information for TCP/IP-based Internets".

Next, a brief description will be given of SNMPv1. A client PC (hereinafter referred to as "the manager"), on which the network management software is in operation, and a managed network device (hereinafter referred to as "the agent"), on which an SNMPv1 agent is in operation, communicate with each other using SNMPv1 (see FIG. 1). There are four kinds of SNMPv1 commands, which are called GetRequest, GetNextRequest, SetRequest, and TRAP, respectively.

GetRequest and GetNextRequest are sent from the manager to the agent so as to acquire the value of the MIB object of the agent. The agent, which has received these commands, notifies the manager of the value of the MIB.

SetRequest is sent from the manager to the agent when the manager sets a MIB object value to the agent. The agent, which has received this command, notifies the manager of the result of the setting of the MIB object value.

TRAP is sent from the agent to the manager so as to notify the manager of a change in a state of its own.

The SNMPv1 agent operates on a network board connected to a PC, a printer, and/or the like, and the network management software, which serves as an SNMPv1 manager, operates on the PC. Examples of the network management software include various types from a stand alone type, which operates on the PC, to a server type which can be accessed from a WEB browser.

SNMPv1 is widely used and is mounted on various network devices, since it is simple in specification and easy to mount.

However, SNMPv1 suffers from the problem that it has a low security function, and hence SNMPv3 is standardized which is capable of protecting SNMP packets from wiretapping, impersonation, alteration, and resending, on the network (see FIG. 2).

In SNMPv3, the SNMP manager and the SNMP agent of SNMPv1 are generically referred to as SNMP entities. The SNMP entity is comprised of an SNMP engine and an SNMP application (see FIG. 3).

The SNMP engine is identified by an SNMP engine ID within the same management domain, and provides services for authentication, transmission and reception of encrypted messages, and control of access to managed objects.

Referring to FIG. 3, the SNMP engine is comprised of four component elements, i.e. a dispatcher, a message processing subsystem, a security subsystem, and an access control subsystem. The dispatcher performs transmission and reception of SNMP messages to and from the network. The message processing subsystem analyzes the SNMP messages (PDU). The security subsystem performs the authentication and encryption processing of the SNMP messages. The access control subsystem performs restriction on access to the MIB object.

Differently from community name-based authentication in SNMPv1, the security subsystem carries out the authentication and encryption on a user basis. Further, SNMPv3 supports privacy functions (encryption and decryption), which are not supported by SNMPv1. The user authentication and the privacy functions can be set on a user-by-user basis. A method of supporting HMAC-MD5-96 and NMAC-SHA-96 as user authentication protocols, and CBC-DES as a privacy protocol is described in RFC 3414.

The SNMP application is comprised of five sections: a command transmitting section, a command response section, a notification transmitting section, a notification receiving section, and a proxy section. The command response section responds to requests for acquiring and setting the MIB project. The notification transmitting section transmits notifications, such as TRAP. The proxy section transfers SNMP messages.

Commands used in SNMPv3 include GetBulkRequest and InformRequest in addition to the commands GetRequest, GetNextRequest, SetRequest, and TRAP in the case of SNMPv1.

GetBulkRequest is a command by which the entity acquires the value of the MIB object from another entity. This is a command obtained by improving the access efficiency of GetNextRequest, and makes it possible to acquire a designated number of instances from the instances of designated objects.

As distinct from the event notification of TRAP which is a one-way notification, InformRequest is an event notification command requiring response confirmation.

SNMPv3 is defined in detail in RFCs, including RFC3411, RFC3412, RFC3413, RFC3414, RFC3415, and RFC3416 (RFC3411: "An Architecture for Describing Simple Network Management Protocol (SNMP) Management Frameworks" http://www.faqs.org/rfcs/rfc3411.html; RFC3412: "Message Processing and Dispatching for the Simple Network Management Protocol (SNMP)" http://www.faqs.org/rfcs/rfc3412.html, RFC3413 "Simple Network Management Protocol (SNMP) Applications" http://www.faqs.org/rfcs/rfc3413.html; RFC3414 "User-based Security Model (USM) for version 3 of the Simple Network Management Protocol (USM) (SNMPv3)" http://www.faqs.org/rfcs/rfc3414.html; RFC3415 "View-based Access Control Model (VACM) for the Simple Network Management Protocol (SNMP)" http://www.faqs.org/rfcs/rfc3415.html; RFC3416 "Version 2 of the Protocol Operations for the Simple Network Management Protocol (SNMP)" http://www.faqs.org/rfcs/rfc3416.html)

Next, a description will be given of device search. To manage network devices, first, it is necessary to search for devices connected to a network. To search for the devices connected to the network, device search is executed by broadcasting SNMPv1. FIG. 4 is a view showing the outline of how device search is carried out.

As shown in FIG. 4, a server 101, on which an integrated device management application is in operation, transmits broadcast packets of SNMPv1, and finds a device 102 and a device 103, on which SNMPv1 is in operation, by the search to thereby acquire and hold device information on the device 102 and the device 103. An IT manager accesses the integrated device management application from a PC 100 via a browser, and displays the results of the device search, as shown in FIG. 5. A sequence of the device search is performed in two phases, as shown in FIG. 6.

A device search section in the integrated device management application carries out SNMPv1 broadcast in Phase 1. The devices 102 and 103 respond to the SNMPv1 request. Device information necessary for using the functions of the integrated device management application is additionally acquired from the devices found by the search, in Phase 2 (see Japanese Laid-Open Patent Publication (Kokai) No. 2000-339259 and Japanese Laid-Open Patent Publication (Kokai) No. 2001-282655). Further, in the case of SNMPv3 devices, only IP addresses are displayed as a list, as shown in FIG. 7.

However, when only IP addresses are displayed as a list of device information, it is difficult to identify devices, which considerably degrades operability of the device management application used by the IT manager.

Further, there has also been proposed a device search method which acquires only basic information on devices by a third protocol (e.g. SLP (Service Location Protocol)) other than SNMPv1 and SNMPv3. The reason for acquiring only basic information on devices is to ensure security.

However, the device search method of acquiring only basic device information by the third protocol is limited in the acquired device information. This places restrictions on the functions of the device management application, such as the function of displaying a list of device information, and a device filter function, which considerably degrades the operability of the device management application used by the IT manager.

SUMMARY OF THE INVENTION

The present invention provides a network management system and a network management method which are capable of easily identifying devices, and enhancing the operability of a device management application used by a manager.

In a first aspect of the present invention, there is provided a network management system comprising a reception unit configured to receive an instruction for searching for devices on a network, a search unit configured to carry out a first search based on a first protocol and a second search based on a second protocol, in response to reception of the instruction by the reception unit, and a display unit configured to display a list of the devices found by the search unit, wherein the display unit displays the devices found by the search unit in a manner distinguishable between devices found by the first search and devices found by the second search.

With the configuration of the network management system according to the first aspect of the present invention, it is possible to easily identify devices, and enhance the operability of a device management application used by a manager.

The network management system further comprises a first acquisition unit configured to acquire device information from the devices found by the first search by the search unit, based on the first protocol, and a second acquisition unit configured to acquire device information from the devices found by the second search carried out by the search unit, based on the second protocol, and the display unit displays the device information acquired by the first acquisition unit and the second acquisition unit.

The network management system further comprises a determination unit configured to determine whether or not authentication information for accessing a device found by the second search carried out by the search unit is registered in an information processing apparatus, and when it is not determined by the determination unit that the authentication information is registered, the second acquisition unit does not acquire the device information on the device, whereas when it is determined by the determination unit determines that the authentication information is registered, the second acquisition unit acquires the device information on the device.

When it is not determined by the determination unit that the authentication information is registered, the display unit can display a screen for instructing registration of the authentication information.

The display unit displays respective device names of devices found by the first search and respective device names of devices found by the second search.

The first protocol can be SNMPv1, and the second protocol can be SNMPv3.

The device information acquired by the first acquisition unit and the second acquisition unit are details of device information which are not acquired by the search unit.

The device information acquired by the second acquisition unit can include an engine ID, and the engine ID comprises an enterprise ID, a MAC address, and a product name of the device.

In a second aspect of the present invention, there is provided a network management system comprising a reception unit configured to receive an instruction for searching for devices on a network, a search unit configured to search for devices on the network, in response to reception of the instruction by the reception unit, a determination unit configured to determine operation modes of the devices found by the search unit, a first acquisition unit configured to acquire device information from a device found by the search unit based on a first protocol when it is determined by the determination unit that the device operates in a first operation mode, a second acquisition unit configured to acquire device information from a device found by the search unit based on a second protocol when it is determined by the determination unit that the device operates in a second operation mode, and a display unit configured to display the device information acquired by the first acquisition unit or the second acquisition unit.

The network management system further comprises a second determination unit configured to determine whether or not authentication information for accessing a device found by the search unit is registered in an information processing apparatus, when it is determined by the determination unit that the device operates in the second operation mode, wherein when it is determined by the second determination unit that the authentication information is registered, the second acquisition unit acquires device information from the device based on the first protocol, whereas when it is not determined by the second determination unit that the authentication information is registered, the second acquisition unit acquires device information from the device based on the second protocol.

The search unit can search for devices on the network based on the second protocol.

The first acquisition unit can acquire device information based on a third protocol different from the first protocol and the second protocol.

The first protocol, the second protocol, and the third protocol can be SNMPv3, SLP, and SNMPv1, respectively.

The device information acquired by the second acquisition unit can include an engine ID, and the engine ID comprises an enterprise ID, a MAC address, and a product name of the device.

In a third aspect of the present invention, there is provided a network management method comprising a reception step of receiving an instruction for searching for devices on a network, a search step of carrying out a first search based on a first protocol and a second search based on a second protocol, in response to reception of the instruction in the reception step, and a display step of displaying a list of the devices found in the search step on a display, wherein the display step displays the devices found in the search step on the display in a manner distinguishable between devices found by the first search and devices found by the second search.

In a fourth aspect of the present invention, there is provided a network management method comprising a reception step of receiving an instruction for searching for devices on a network, a search step of searching for the devices on the network, in response to reception of the instruction in the receiving step, a determination step of determining operation modes of the devices found in the search step, a first acquisition step of acquiring device information from a device found in the search step based on a first protocol when it is determined in the determination step that the device operates in a first operation mode, a second acquisition step of acquiring device information from a device found in the search step based on a second protocol when it is determined in the determination step that the device operates in a second operation mode, and a display step of displaying the device information acquired in the first acquisition step or the second acquisition step.

The features and advantages of the invention will become more apparent from the following detailed description taken in conjunction with the accompanying drawings.

BRIEF DESCRIPTION OF THE DRAWINGS

FIG. 5 is a view showing an example of display of device information acquired by device search.

FIG. 7 is a view showing an example of display of device information acquired by SNMPv3 search.

FIG. 14 is a view showing an example of display of a list of device information acquired by the first search method.

FIG. 15 is a view showing an example of a password input screen

FIG. 19 is a view showing an example of display of a list of device information acquired by a second search method.

FIG. 21 is a view showing an example of display of device information monitored by a device monitoring section.

FIG. 22 is a view showing an example of display of device information managed by a driver management section.

FIG. 23 is a view of an example of a device search task generating screen.

FIG. 24 is a view of an example of a device search task generating screen.

FIG. 25 is a view of an example of a device search task generating screen.

DETAILED DESCRIPTION OF THE PREFERRED EMBODIMENTS

The present invention will now be described in detail below with reference to the accompanying drawings showing preferred embodiment thereof.

Figure 1:
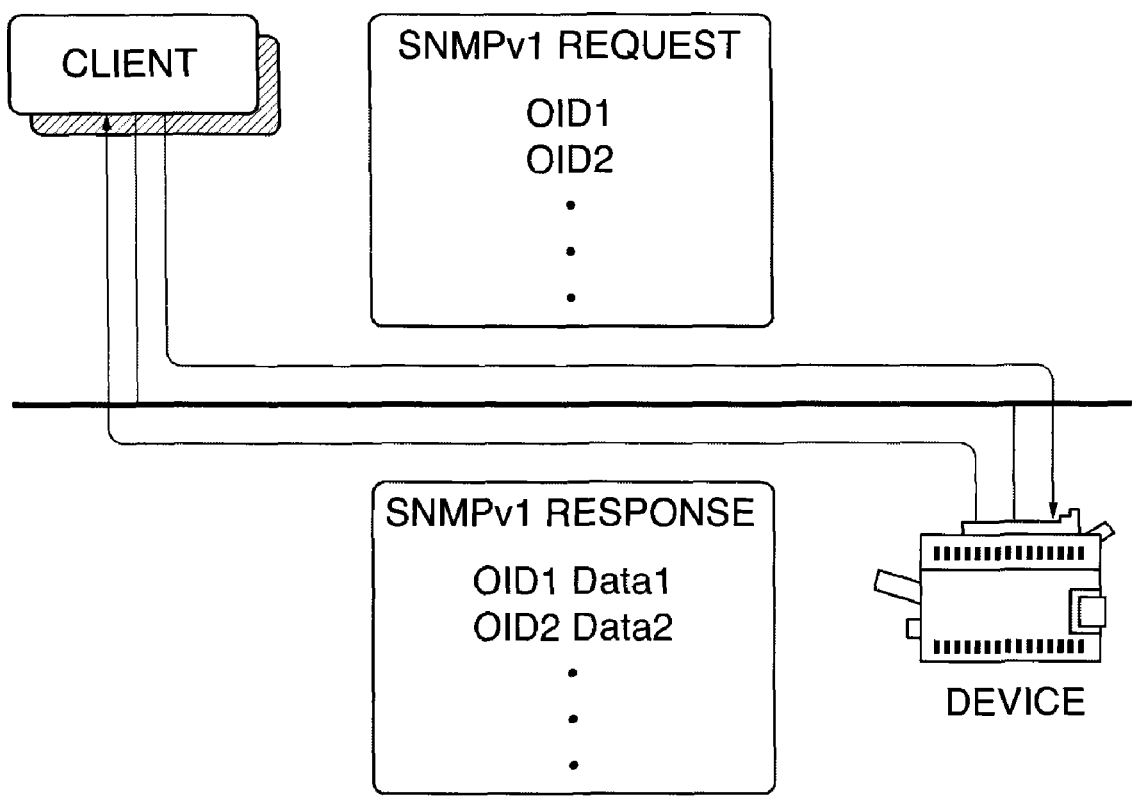
FIG. 1 is an explanatory-view useful in explaining management of devices by SNMPv1.
Figure 2:
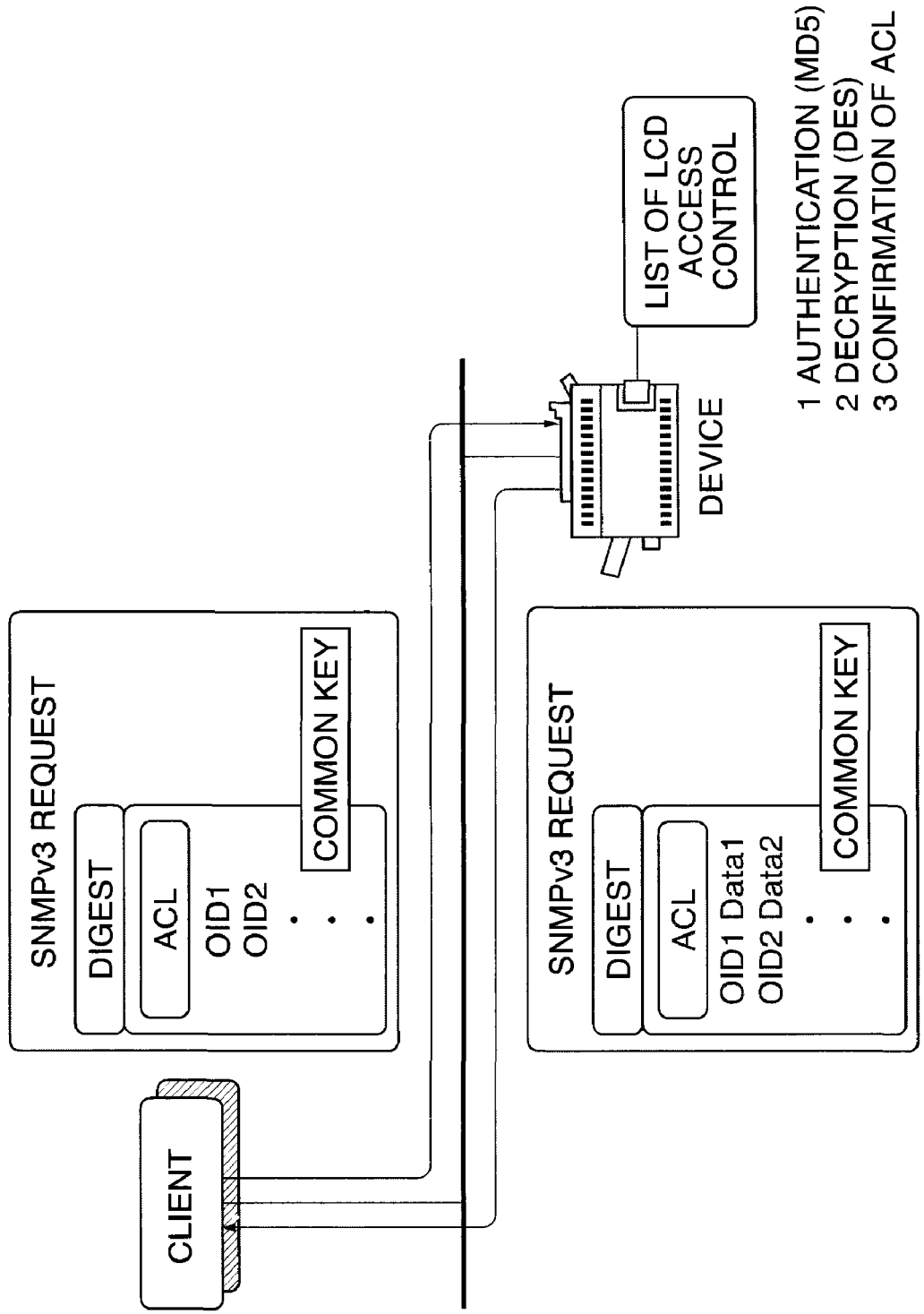
FIG. 2 is an explanatory view useful in explaining management of devices by SNMPv3.
Figure 3:
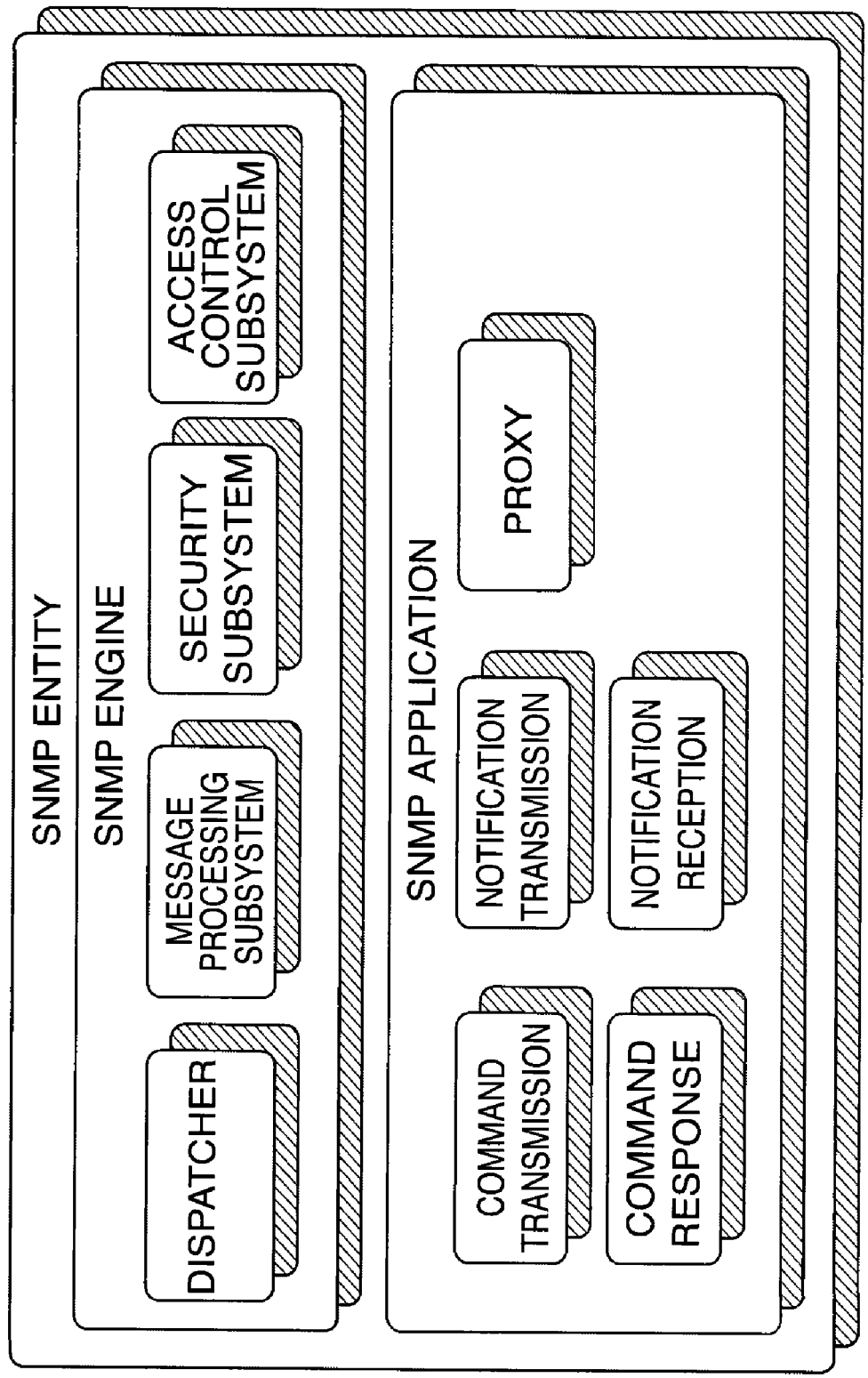
FIG. 3 is an explanatory view useful in explaining an SNMP entity.
Figure 4:
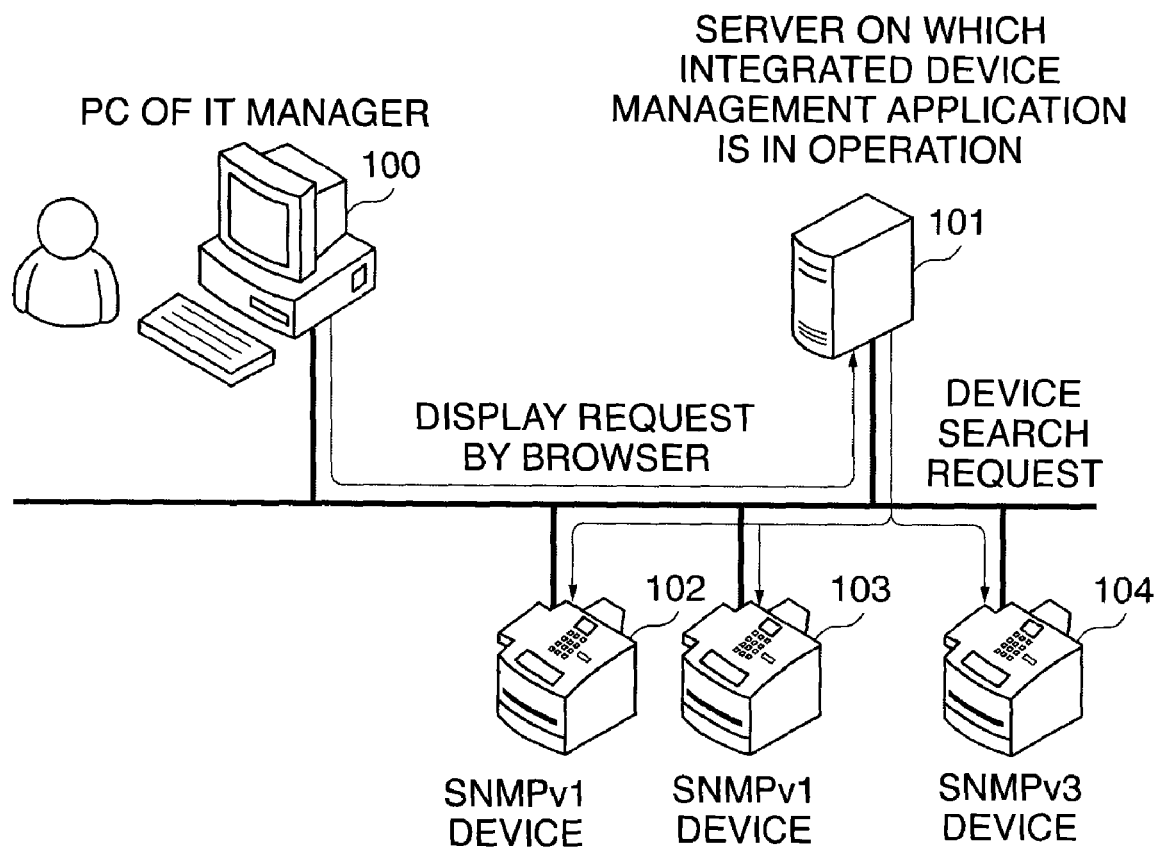
FIG. 4 is an explanatory view useful in explaining conventional device search.
Figure 6:
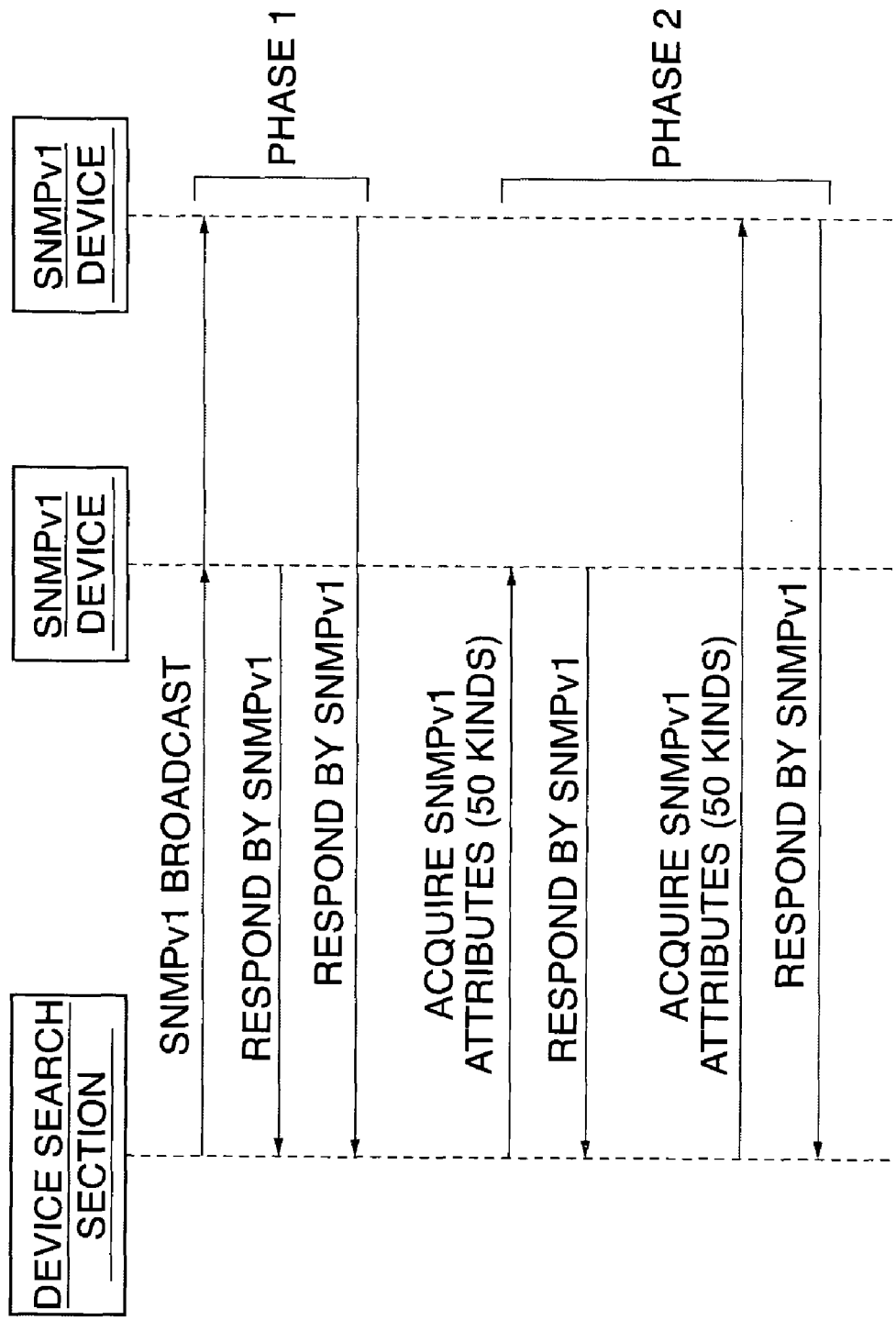
FIG. 6 is a sequence diagram showing the device search.
Figure 8:
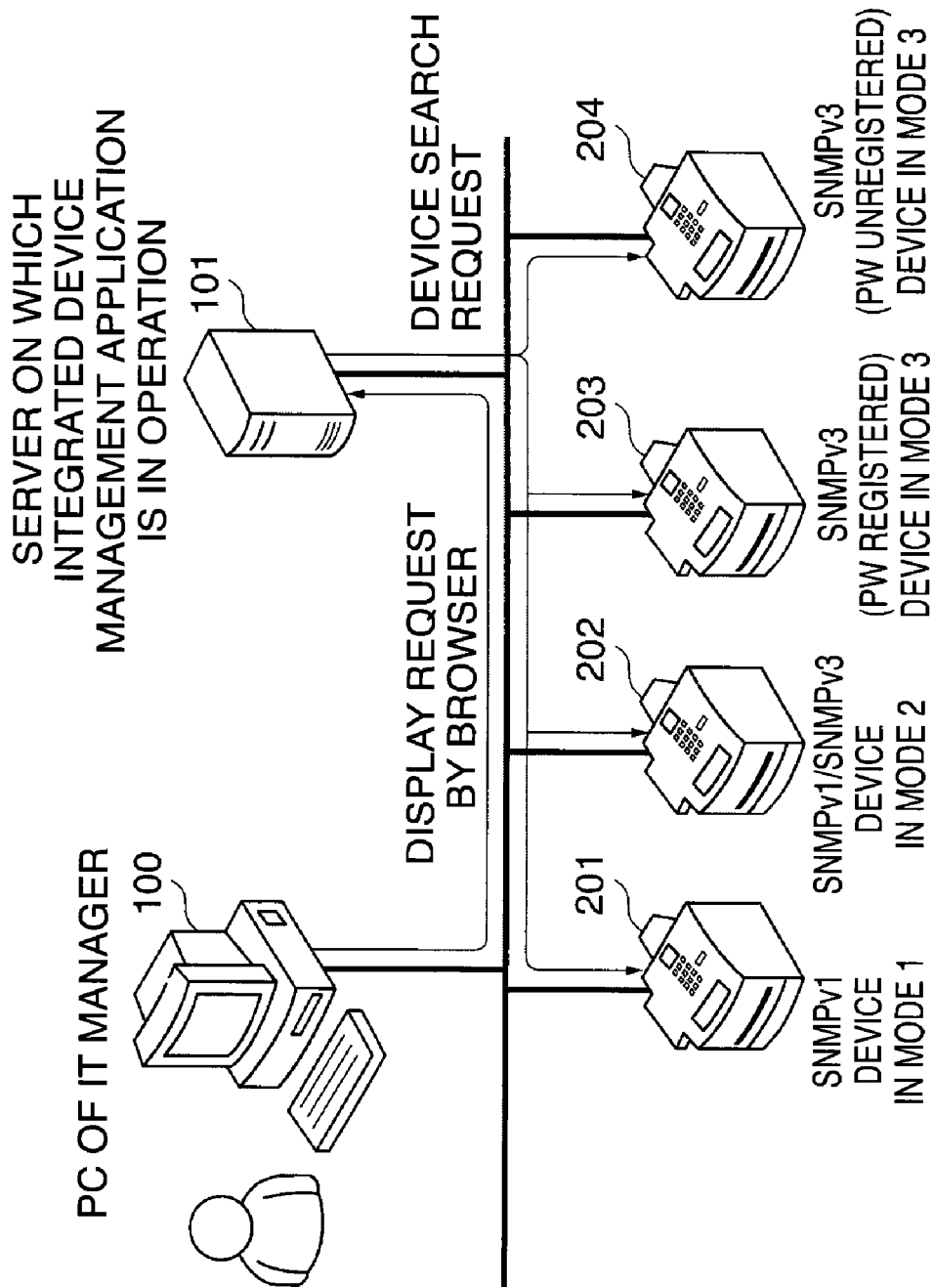
FIG. 8 is an explanatory view which is useful in explaining search for SNMPv3 devices performed by a network management system according to an embodiment of the present invention.

FIG. 8 is a view showing the outline of search for devices (device search) performed in an environment in which an SNMPv1 device and an SNMPv3 device are mixed, which is an example of a network management system according to the present invention. The SNMPv1 device and the SNMPv3 device have the following three operation modes depending on the settings of an SNMPv1 protocol and an SNMPv3 protocol.

Mode 1: Only the SNMPv1 protocol operates.
Mode 2: Both the SNMPv1 protocol and the SNMPv3 protocol operate.
Mode 3: Only the SNMPv3 protocol operates.

A device 201 operates in the mode 1. A device 202 operates in the mode 2. A device 203 operates in the mode 3, whose authentication password and encrypted password are registered in a database within an integrated device management application because the device 203 has once been found by the search. A device 204 operates in the mode 3, whose authentication password and encrypted password are not registered in the database.

The integrated device management application, which operates on a server (management apparatus) 101 connected to the devices 201 to 204 via a network, such as a LAN, searches for the devices. An IT manager accesses from a PC (information processing apparatus) 100 connected to the server 101 via the network to the integrated device management application using a browser, and displays the results of the device search on a CRT, a liquid crystal display, or a like display device.

Figure 9:
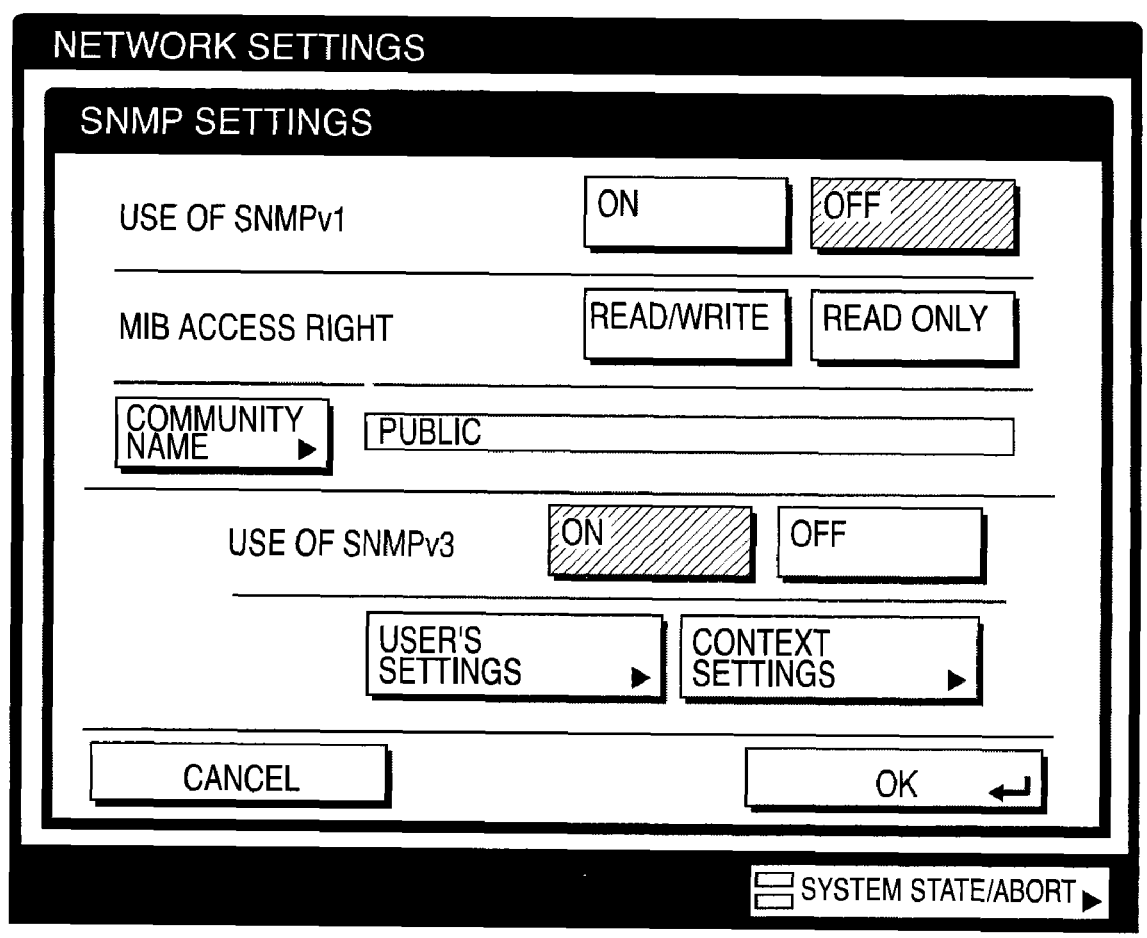
FIG. 9 is a view of an SNMP protocol setting screen displayed on an image processing apparatus which is an example of the device.

FIG. 9 is a view of an SNMP protocol setting screen displayed on an image processing apparatus (device). On the SNMP protocol setting screen, it is possible to set ON/OFF of SNMPv1, the access right to the MIB, the community name of SNMPv1, ON/OFF of SNMPv3, a password, and so forth. The device search classifies the operations thereof into the aforementioned three modes according to a combination of the above settings of the protocols.

Figure 10:
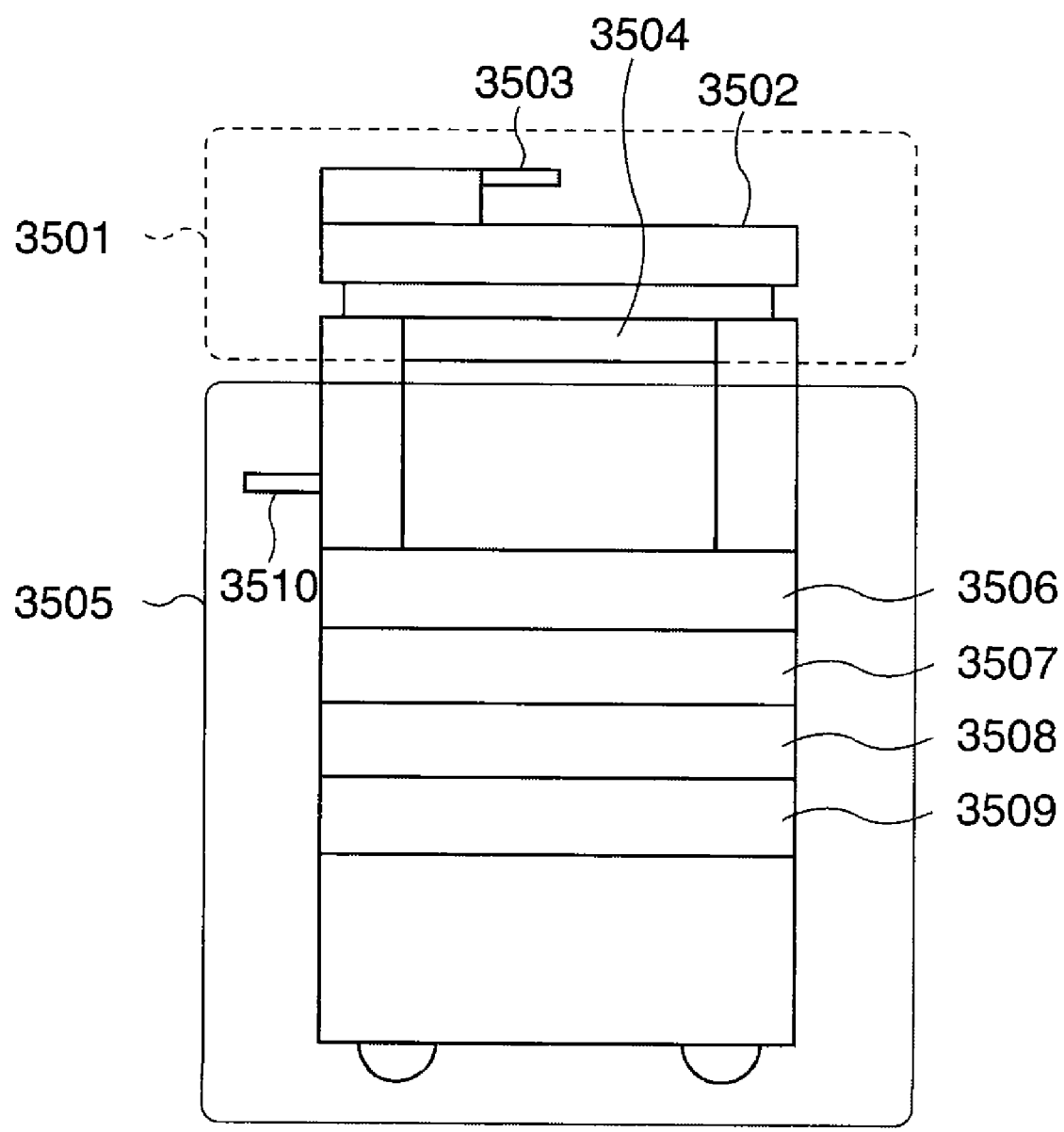
FIG. 10 is a schematic view of the image processing apparatus, which is an example of the device.

FIG. 10 is a view of the appearance of the image processing apparatus. In the image processing apparatus, a scanner section 3501 as an image input device illuminates an image formed on an original to scan a CCD line sensor, not shown, whereby the image is read and the read image is converted into an electric signal representative of raster image data. A user sets originals on a tray 3503 of an original feeder 3502, and instructs the start of reading the originals via an operating section. Then, when a controller CPU, not shown, gives the instruction to the scanner 3501, the feeder 3502 feeds the originals one by one, whereby a read operation is executed to read images on the originals.

A printer section 3505, which is an image output device, is provided for converting the electrical raster image data to a visible image on a sheet. Examples of the conversion method include an electrophotographic conversion method using a photosensitive drum or a photosensitive belt, and an inkjet conversion method in which an image is directly printed on a sheet by jetting ink onto the sheet from an array of very small nozzles, and any suitable conversion method may be employed. A printing operation is started by an instruction from the controller CPU. The printer section 3505 has a plurality of sheet feeders which enable different sheet sizes or different orientations of sheets to be selected, and contains cassettes 3506, 3507, 3508, and 3509 associated therewith. Further, a discharge tray 3510 is provided for receiving sheets on which images have been printed.

Figure 11:
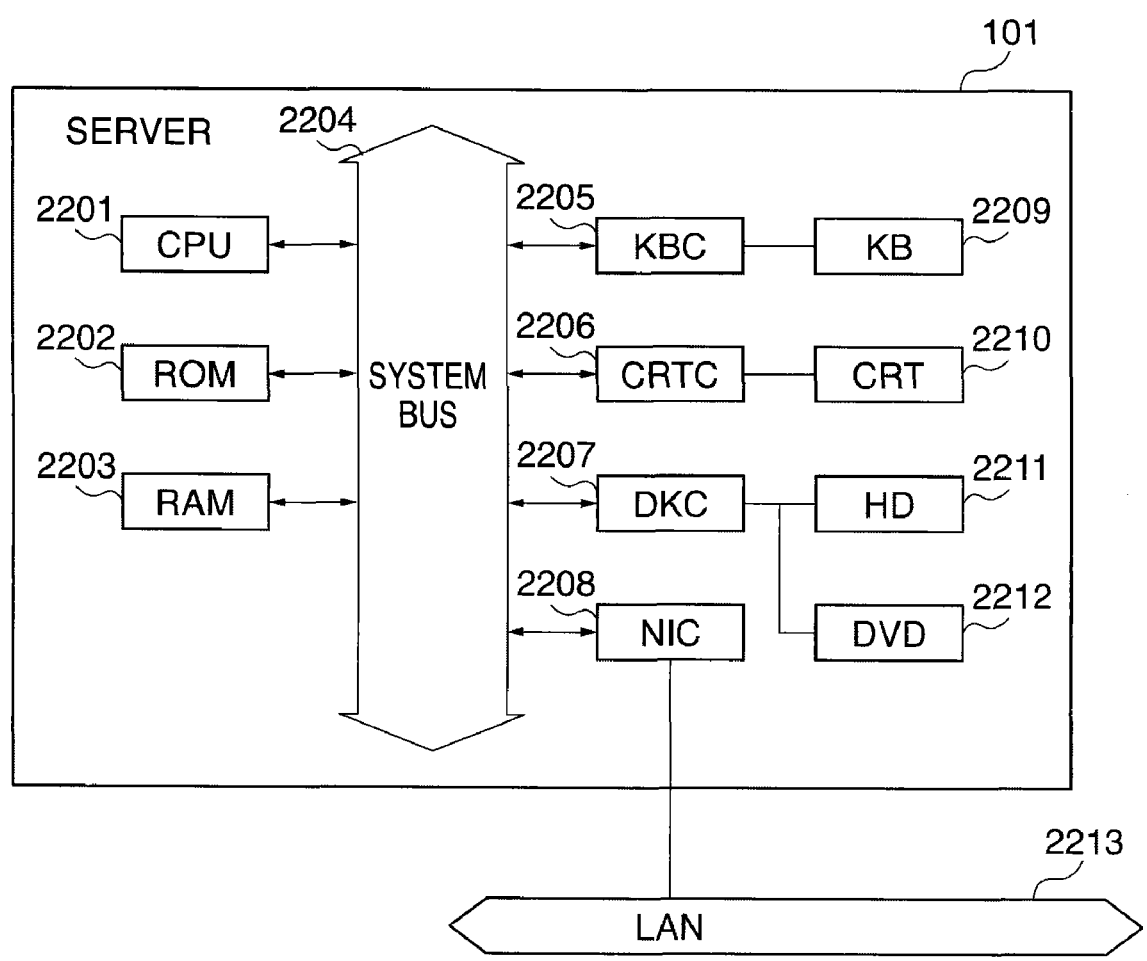
FIG. 11 is a block diagram of an example of hardware on which the integrated device management application operates.

FIG. 11 is a view of an example of the configuration of the server 101 on which the integrated device management application operates. The server 101 is comprised of a COU 2201, a ROM 2202, a RAM 2203, a system bus 2204, a keyboard controller (KBC) 2205, a CRT controller (CRTC) 2206, and a disk controller (DKC) 2207. Further, the server 101 is comprised of a network interface card (NIC) 2208, a keyboard (KB) 2209, a CRT display (CRT) 2210, a hard disk (HD) 2211, and a DVD drive 2212. The server 101 is connected to the devices 201 to 204 and the PC 100 via a LAN 2213.

The hard disk (HD) 2211 stores the program of the integrated device management application. The operation of the server 101 is predominantly executed by the CPU 2201 as hardware, and the control of the same is mainly executed by the integrated device management application stored in the hard disk (HD) 2211. Although in the present embodiment, Windows (registered trademark) XP (available from Microsoft Corporation) is assumed as an OS, by way of example, this is not limitative.

The integrated device management application may be supplied in a manner stored in a storage medium, such as a DVD or a CD-ROM. In this case, programs are read from the storage medium e.g. by the DVD drive (DVD) 2212 appearing in FIG. 11 or a CD-ROM drive, not shown, and installed in the hard disk (HD) 2211.

Figure 12:
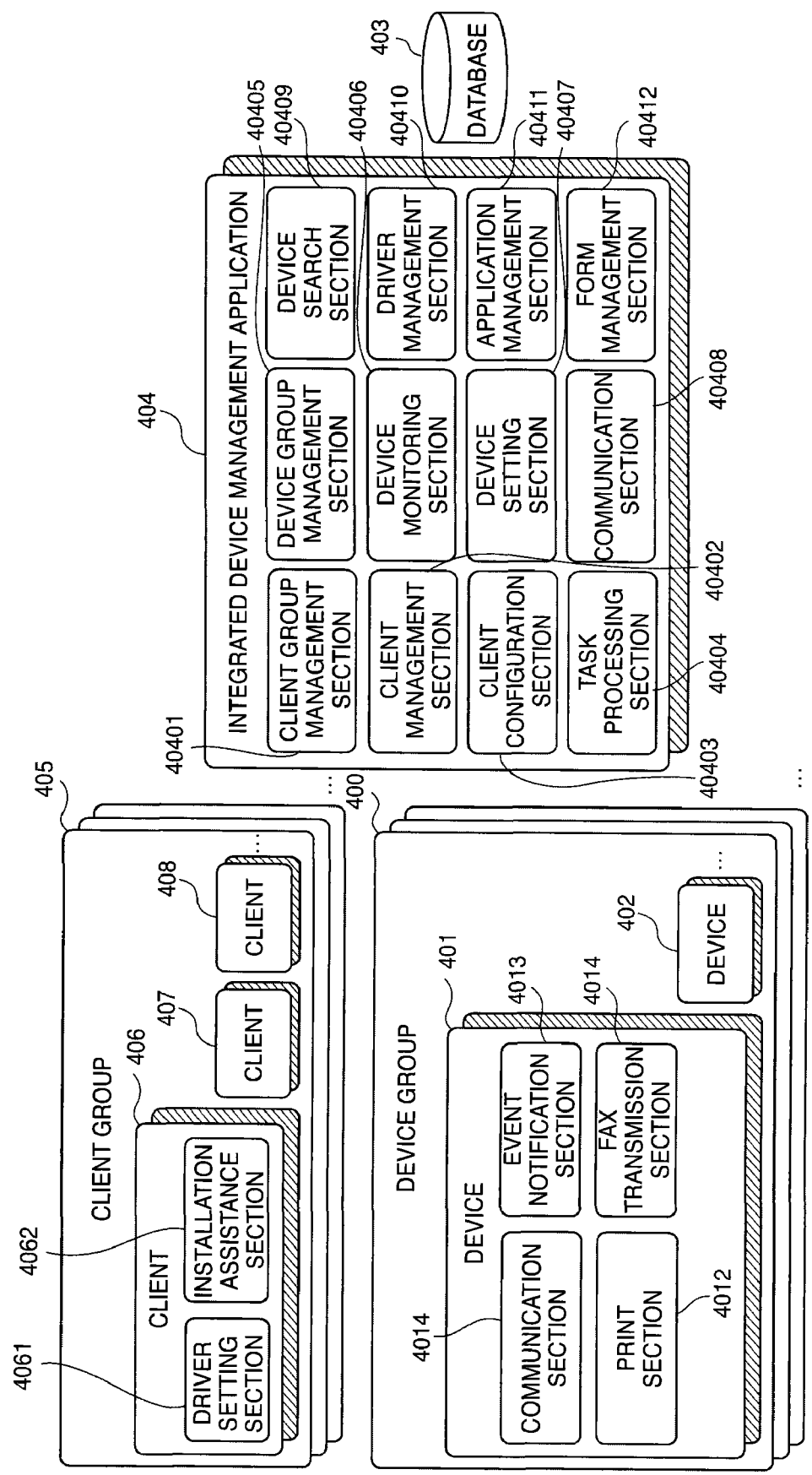
FIG. 12 is a view for explaining an example of the configuration of an integrated device management application, a client group, and a device group.

FIG. 12 is a block diagram of an example of the arrangement of the integrated device management application 404, a client group 405, and a device group 400.

The integrated device management application 404 includes a client group management section 40401, a client management section 40402, a client configuration section 40403, a device group management section 40405, and a device monitoring section 40406. Further, the integrated device management application 404 includes a device setting section 40407, a device search section 40409, a driver management section 40410, an application management section 40411, a form management section 40412, a communication section 40408, and a task processing section 40404.

The client group management section 40401 manages clients by classifying them into groups, such as departments of a company, and holds information on the groups, and a list of the clients included in the groups in a database 403. The client management section 40402 manages information on client PCs, and holds information concerning the clients, such as the addresses and users of the client PCs, drivers and applications installed in the client PCs. The client configuration section 40403 changes the settings of the drivers of the clients, and performs push installation of the drivers and the applications.

The device group management section 40405 manages devices by classifying them into groups, such as departments of a company, and holds information on the devices, and a list of the devices included in the groups in the database 403. The device monitoring section 40406 manages the information on the devices, and holds information concerning the devices, such as the IP addresses, location information, and optional configurations of the devices. The device setting section 40407 performs setting of the device information and event registration in the devices using protocols, such as SNMPv1 and SNMPv3. The device search section 40409 searches for the devices, and holds the devices found by the search in the database 403, as will be described in detail hereinafter.

The driver management section 40410 manages an install set of drivers held in a file server. The application management section 40411 manages an install set of applications held in the file server. The form management section 40412 manages forms held in the file server. The communication section 40408 communicates with the devices using protocols e.g. of SNMP/Web service. The task processing section 40404 executes tasks processed by the device search section 40409 and the driver management section 40410, and notifies associated ones of the sections of details of a task according to the kind of the task.

The client group 405 contains one or more clients. The client group is defined as a department of a company, for example.

Each client indicates a terminal with which a user carries out a printing operation using the associated application, and includes a driver setting section 4061 and an installation assistance section 4062. The driver setting section 4061 is provided for changing the setting information on drivers, that is, setting information registered in a registry, such as default print setting information including information concerning use of the double-sided function, 4-in-1 print, and so forth. The installation assistance section 4062 assists the installation of new drivers and applications which are push-installed from the integrated device management application 404.

More specifically, the installation assistance section 4062 receives an install set of new drivers and applications from the integrated device management application 404, and held them in the client for installation.

The device group 400 contains one or more devices. The device group is defined as a department of a company, for example.

A device 401 is a multifunctional image processing apparatus having the print, scan, and Fax functions, and is comprised of an event notification section 4013, a print section 4012, a Fax transmission section 4014, and a communication section 4011.

When some event has occurred, the event notification section 4013 notifies registered clients of the event. The print section 4012 prints documents. The Fax transmission section 4014 transmits data by Fax transmission via a telephone line or an ISDN (integrated services digital network). The communication section 4011 communicates with the clients using protocols, such as SNMPv1 and SNMPv3.

Next, a description will be given of two search methods according to the present invention, for enhancing the operability of the integrated device management application. The two search methods are mounted on the device search section 40409 of the integrated device management application operating on the server 101.

First, a first search method employs an engine ID acquiring function of SNMPv3, for searching for devices. In acquiring an engine ID, only four items of information on a device, i.e. the manufacturer (enterprise ID), IP address, MAC address, and product name of the device, are acquired without being encrypted. It is within the range of the specifications of SNMPv3 and one of the characteristics of the present invention that the product name is included in the engine ID.

Figure 13:
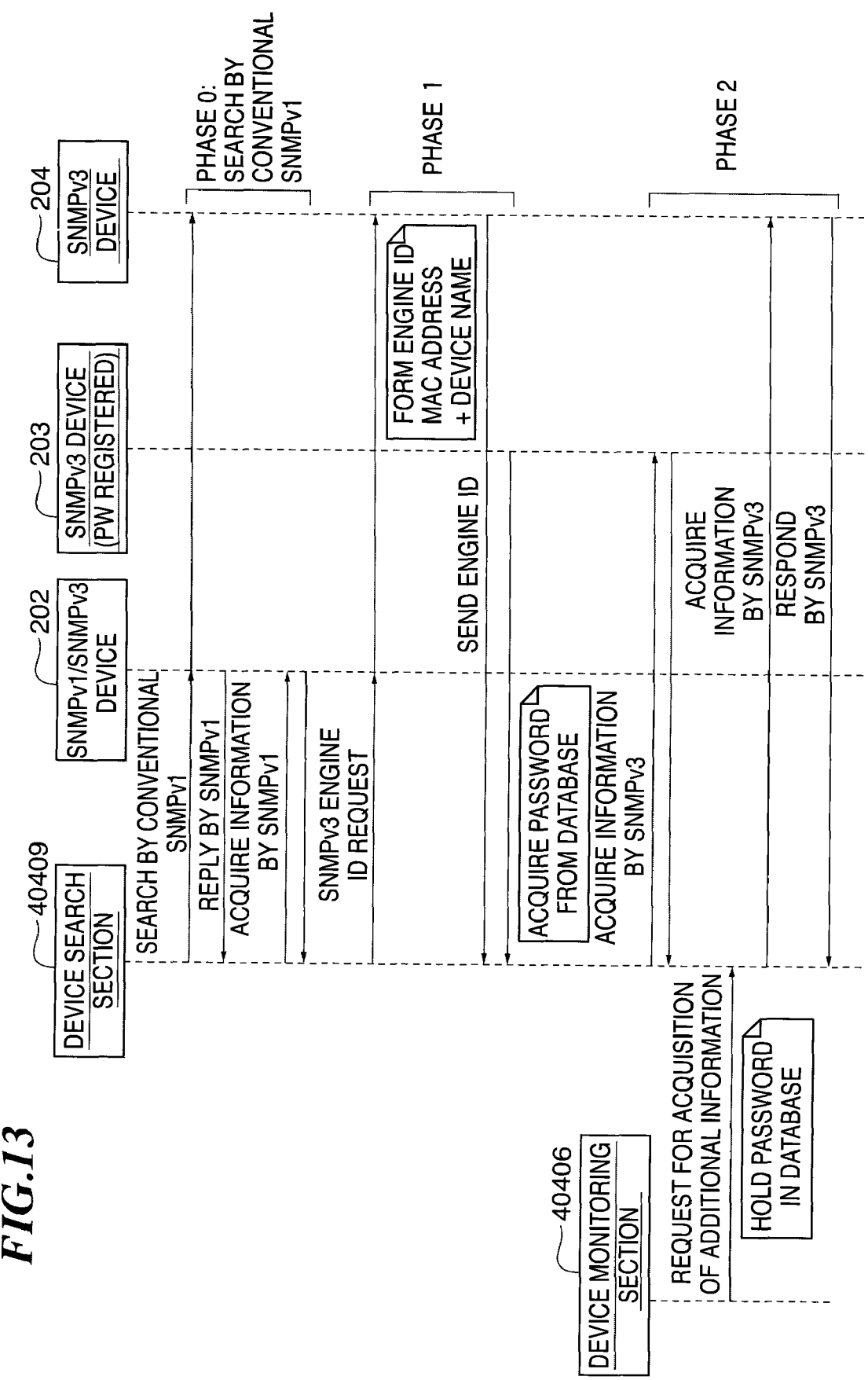
FIG. 13 is a sequence diagram showing a first search method.

FIG. 13 is a view showing a sequence of the first search method. In this figure, there are illustrated a sequence of operations performed between the device search section 40409 of the integrated device management application, the device 202, the device 203, the device 204, and the device monitoring section 40406 of the integrated device management application. The device 202 is a device (mode 2) configured such that both SNMPv1 and SNMPv3 operate thereon. The device 203 is a device (mode 3) on which only SNMPv3 operates, and whose password has already been registered in the database. The device 204 is a device (mode 3) on which only SNMPv3 operates, and whose password is not registered in the database. It should be noted that the operation of the device 201 in the mode 1 in which only SNMPv1 is in operation is the same as that of the device 202 in the mode 2.

The first search method searches for devices in the following three phases.

Phase 0: search by the conventional SNMPv1
Phase 1: acquisition of the engine ID of a device by SNMPv3; The engine ID is formed by an enterprise name+a MAC address+a device name.
Phase 2: acquisition of device information by SNMPv3

The device search section 40409 of the integrated device management application searches for a device by using conventional SNMPv1 as Phase 0. The device 201 that operates in the mode 1 and the device 202 that operates in the mode 2 are found by the search using SNMPv1.

Next, an engine ID is requested by SNMPv3 broadcast in Phase 1. When the engine ID is acquired, the password of the device is not requested due to the specifications of the SNMPv3. The procedure for acquiring the engine ID is described in RFC 3414. There are defined several kinds of methods of denoting the engine ID. For example, the methods include one which denotes only the MAC address as the engine ID.

In the illustrated example, an engine ID replied from the device is formed by an enterprise ID for identification on an enterprise-by-enterprise basis, a MAC address enabling the device to be uniquely identified, and a device name. The engine ID formed by "the enterprise ID+the MAC address+the device name" is one of the characterizing features of the present invention for enhancing the operability of the integrated device management application without deviating from the specifications of the RFC.

The devices 203 and 204 which operate in the mode 3 are found by the search in Phase 1. Device information on the devices 203 and 204 found by the search are held in the database 403. In the case of the device 203, password information thereof has already been held in the database 403, and hence all device information necessary for operation of the integrated device management application is acquired. On the other hand, in the case of the device 204, no password information thereof exists, so that only the engine ID of the device is acquired. Since a device name of the device 204 is contained in the engine ID, it is possible to identify the device 204 by the device name.

In Phase 2, after acceptance of the password of the device 204 input by the user, all device information necessary for the integrated device management application is acquired by SNMPv3 from the device 204. Acquisition of all information on the device 204 is completed in Phase 2.

FIG. 14 is a view of a screen for displaying a list of device information in the integrated device management application, acquired by device search by the first search method.

Devices on which SNMPv1 operates in the modes 1 and 2 have all device information thereof displayed. Similarly, devices on which only SNMPv3 operates in the mode 3 and whose passwords have already been registered in the database 403 also have all device information thereof displayed. In the case of the SNMPv3 devices, by taking into account a case where a password thereof is changed, an Update button is also displayed via which the user inputs its password to update device information. As to devices on which only SNMPv3 operates in the mode 3 and whose passwords are not registered in the database 403, only a device name acquired from an IP address, the version of the SNMP and an engine ID are displayed, but the other device information is not displayed. Therefore, before using the functions of the integrated device management application including a filter function, it is necessary to acquire required device information by depressing a Get button and inputting a password of the device.

FIG. 15 is a view of an SNMPv3 password input screen, which is displayed by depressing the Get button and the Update button.

Figure 16:
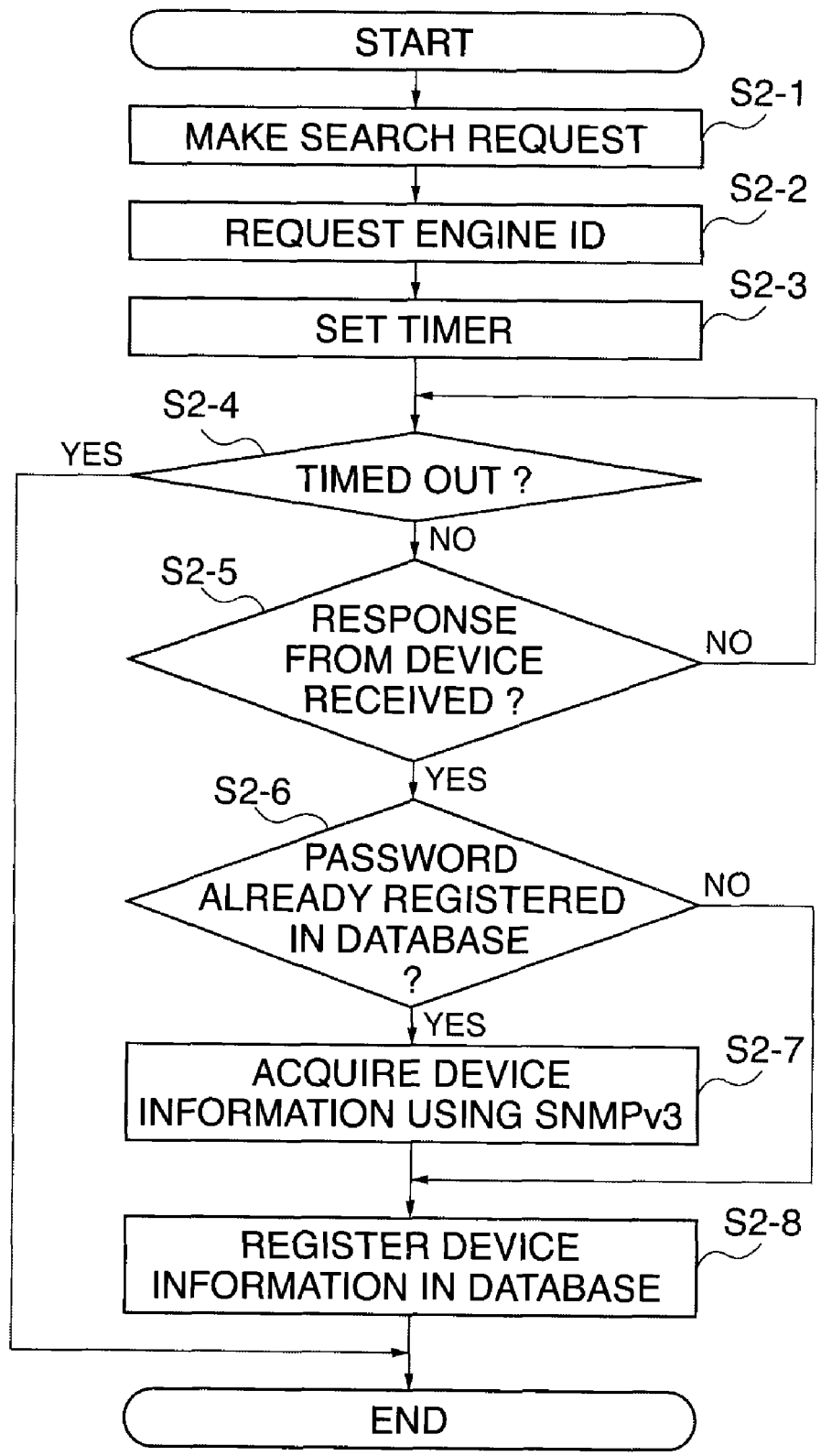
FIG. 16 is a flowchart of a search process performed by a phase 1 of a first search method.

FIG. 16 is a flowchart of a search process by Phase 1 of the first search method.

In a step S2-1, a device search request is accepted by a task operation of the integrated device management application. The task operation will be described in detail hereinafter. In a step S2-2, an engine ID-acquiring request is broadcasted using SNMPv3. In a step S2-3, a timer is set.

In a step S2-4, it is determined whether or not the search process is timed out. If the search process is timed out, the process is immediately terminated, whereas if the search process is not timed out, the process proceeds to a step S2-5, wherein it is determined whether or not a response from the device has been received. If the response from the device has not been received, the process returns to the step S2-4, wherein it is confirmed whether or not the search process is timed out. If the response from the device has been received, the process proceeds to a step S2-6, wherein it is confirmed whether or not the password of the device has already been registered.

If the password of the device has not been registered, the process proceeds to a step S2-8, wherein a MAC address and a product name of the device, which can be determined by analyzing an IP address, the version of SNMP, and an engine ID of the device, are registered in the database 403. Further, in the case of a device being a product of another company, the name of the company is registered from an enterprise ID. When the password of the device is registered, in a step S2-7, all device information necessary for the integrated device management application is acquired using SNMPv3. Then, the process proceeds to the step S2-8, wherein the acquired device information is registered in the database 403.

Figure 17:
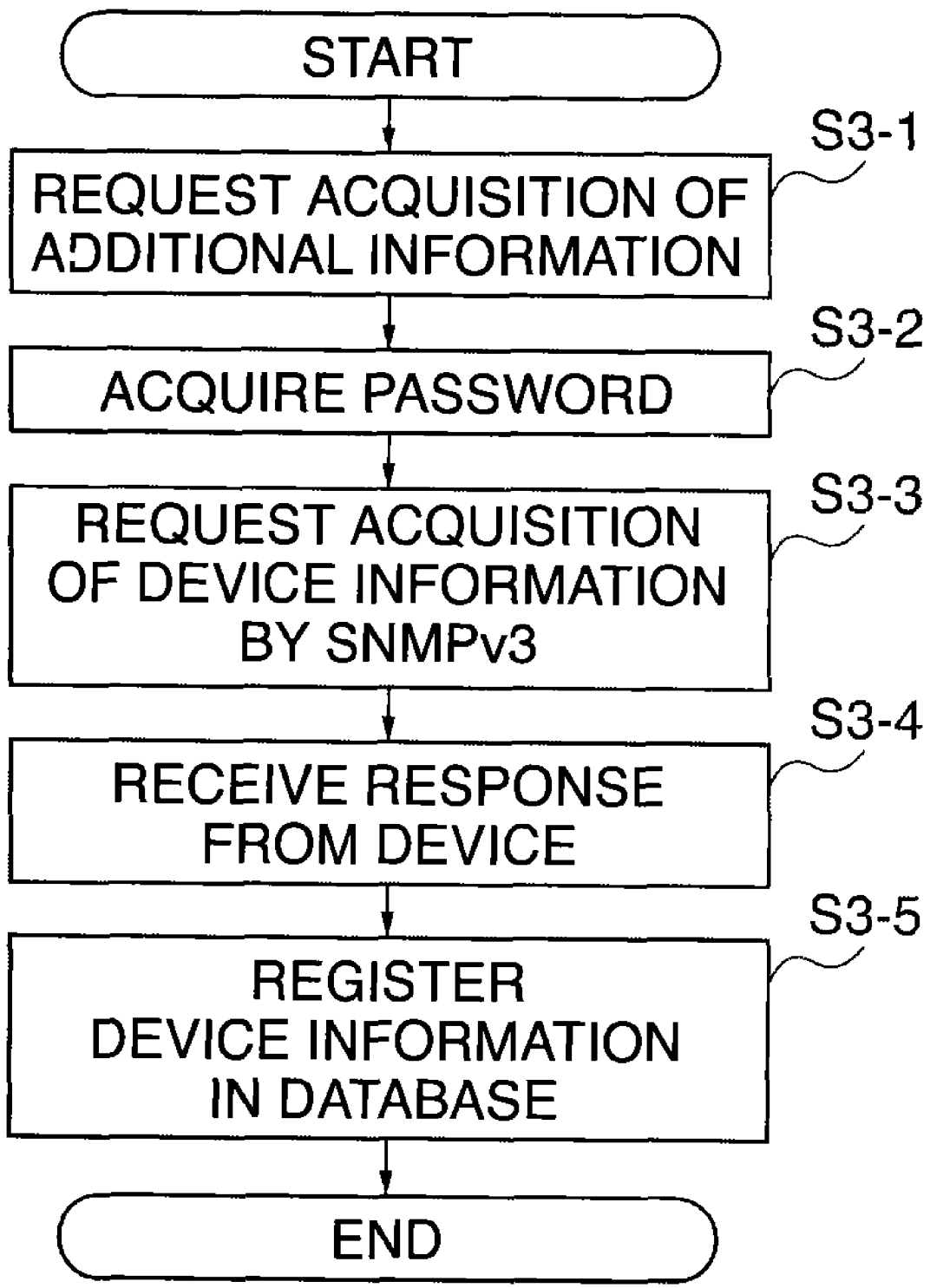
FIG. 17 is a flowchart of an additional information search process by the first search method.

FIG. 17 is a flowchart of an additional information search process executed when the Get button and the Update button shown in FIG. 14 are depressed.

A device which is determined in the step S2-6 in FIG. 16 that its password is not registered in the database 403 has device information only of an IP address, an SNMP version, a MAC address, and a product name, but it has no device information necessary for using the filter function, a device monitoring function, a driver managing function, and so forth. The FIG. 17 flowchart shows the additional information search process for additionally acquiring device information necessary for the operation of the integrated device management application.

First, in a step S3-1, an additional information acquiring request is accepted. Next, in a step S3-2, the password of the device input from the FIG. 15 password input screen is acquired, and in a step S3-3, device information is acquired from the device using SNMPv3. Then, in a step S3-4, a response is received from the device, and in a step S3-5, the device information acquired from the device is held in the database 403. This makes it possible to make full use of the functions of the integrated device management application. Examples of the functions of the integrated device management application will be described using the screens of the device monitoring section 40406 and the driver management section 40410. The first search method is registered as a device search task at a security level 1, for searching the device.

Next, a description will be given of a second search method. The second search method is provided for acquiring an SNMP operation mode by using an SLP protocol to use SNMPv1, SNMPv3 and SLP in combination depending on the operation mode. The second search method makes it possible to acquire not only IP addresses, MAC addresses, product names but also product versions, installation places, network board names, SNMPv3 operation modes, product types, and status codes. Compared with the first search method, the second search method acquires an increased amount of information but accordingly its security level is degraded. However, according to the second search method, the amount of information displayed in the device list is larger, and hence the operability of the integrated device management application becomes higher.

Figure 18:
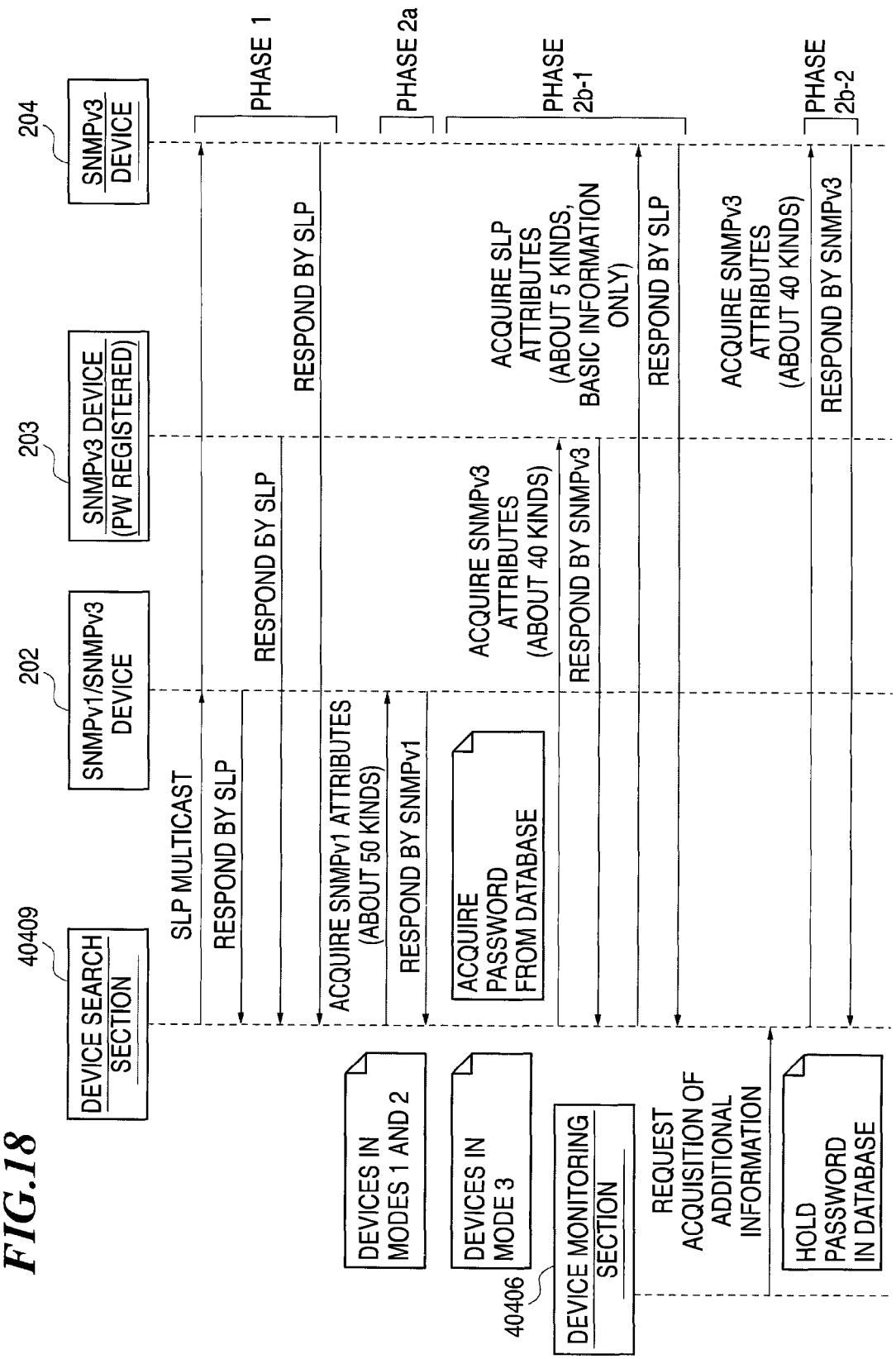
FIG. 18 is a view showing a sequence of a second search method.

FIG. 18 is a view showing a sequence of operations performed by the second search method. The sequence of operations shown in FIG. 18 are performed between the device search section 40409 of the integrated device management application, the device 202, the device 203, the device 204, and the device monitoring section 40406 of the integrated device management application. The device 202 is a device (mode 2) on which both SNMPv1 and SNMPv3 operate. The device 203 is a device (mode 3) on which only SNMPv3 operates and whose password has already been registered in the database. The device 204 is a device (mode 3) on which only SNMPv3 operates and whose password is not registered in the database. It should be noted that the operation of the device 201 on which only SNMPv1 operates is the same as that of the device 202 in the mode 2.

The second search method searches for devices in the following four phases.

Phase 1: acquisition of the address and operation mode of a device, by SLP.

Phase 2a: acquisition of device information by SNMPv1 when SNMPv1 can be used in the operation mode (mode 1 or 2).

When only SNMPv3 can be used in the operation mode (mode 3), device information is acquired by dividing Phase 2 into two stages.

Phase 2b-1: acquisition of only basic information on a device by SLP.

Phase 2b-2: acquisition of all device information acquired in Phase 2 by SNMPv3.

In Phase 1, the address and the SNMP operation mode are acquired using SLP, which is a protocol different from SNMPv1 and SNMPv3. The devices 202, 203, and 204 uses SLP to send the SNMP operation mode as well as the IP address.

In Phase 2a, using SNMPv1, as conventionally, for the devices 201 and 202 whose operation modes are the modes 1 and 2 (in which SNMPv1 operates), whereby all information necessary for the integrated device management application is acquired.

In Phase 2b-1, when the operation mode is the mode 3 (in which only SNMPv3 operates), and at the same time the password of the device is held in the database 403, all information necessary for the integrated device management application is acquired. When the password of the device is not held in the database 403, several attributes, such as a device name, are acquired using SLP. More specifically, in the illustrated example, to ensure the security of the device information, acquisition of only attributes, such as the device name and a MAC address, necessary for minimum recognition of the device is permitted. When the password of device is held in the database 403, an IP address, a MAC address, a product name, a product version, an installation place, a network board name, the SNMP operation mode, a product type, and a status code are acquired as the above necessary information acquired.

This makes it possible to cause SNMPv3 devices to be included in a device list for displaying the results of search for devices while ensuring a certain degree of security, and at the same time in a state in which the devices can be recognized.

In Phase 2b-2, after acceptance of the password of the device 204 input by the user, all device information necessary for the integrated device management application is acquired from the device 204 by SNMPv3. The information on the device 204 is all acquired in Phase 2b-2.

FIG. 19 is a view of a device list screen for displaying a list of device information acquired by searching devices by the first search method in the integrated device management application.

A device on which SNMPv1 operates in the modes 1 and 2 has all device information thereof displayed. Similarly, a device on which only SNMPv3 operates in the mode 3 and whose password has already been registered in the database 403 also has all device information thereof displayed. In the case of a SNMPv3 device, by taking into account a case where a password thereof is changed, an Update button is also displayed via which the user inputs its password to update device information thereof. As to a device on which only SNMPv3 operates in the mode 3 and whose password is not registered in the database 403, device information, such as an installation place and a status code, concerning items displayed on the device list screen, is acquired. However, before using the full functions of the integrated device management application including the filter function, it is necessary to acquire required device information by depressing the Get button and inputting the password of the device.

When the Get button or the Update button is depressed, similarly to the case of the first search method, the FIG. 15 SNMPv3 password input screen is displayed.

Figure 20:
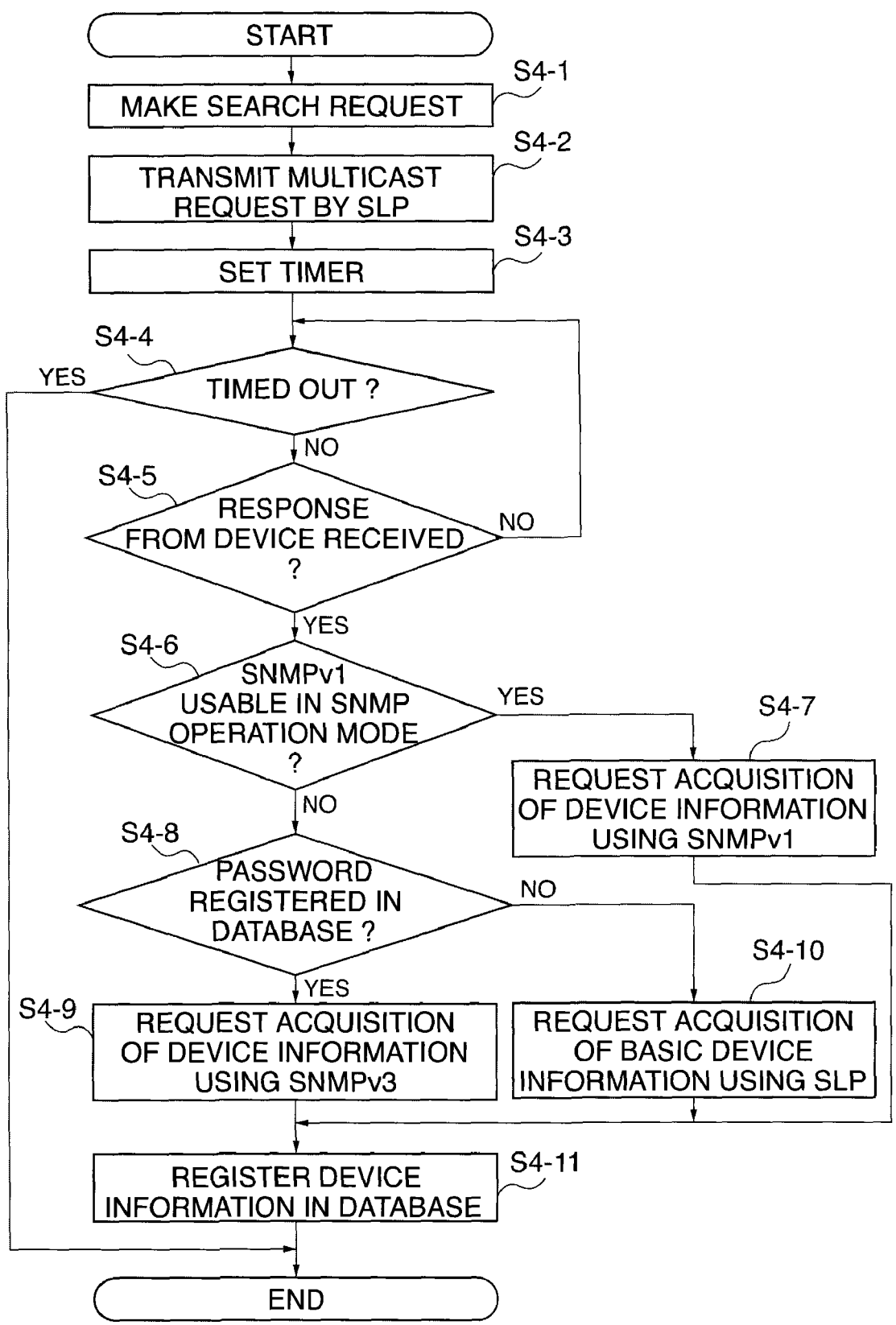
FIG. 20 is a flowchart of a search process carried out by the second search method.

FIG. 20 is a flowchart of a search process carried out by Phase 1, Phase 2a and Phase 2b-1 of the second search method.

In a step S4-1, a device search request is accepted by a task operation of the integrated device management application. The task operation will be described in detail hereinafter. Next, in a step S4-2, a multicast request is made using SLP. In a step S4-3, a timer is set.

In a step S4-4, it is determined whether or not the search process is timed out. If the search process is timed out, the process is immediately terminated, whereas if the search process is not timed out, the process proceeds to a step S4-5, wherein it is determined whether or not a response from the device has been received. If the response from the device has not been received, the process returns to the step S4-4, wherein it is confirmed whether or not the search process is timed out. If the response from the device has been received, the process proceeds to a step S4-6, wherein the SNMP operation mode is confirmed.

In the case of modes (mode 1 or 2) on which SNMPv1 operates in the SNMP operation mode, device information is acquired using SNMPv1. In the case of a mode (mode 3) in which SNMPv1 does not operate in the SNMP operation mode, the process proceeds to a step S4-8, wherein it is confirmed whether or not the password of the device has already been registered.

When the password of the device is registered, in a step S4-9, all device information necessary for the integrated device management application is acquired using the SNMPv3 protocol. When the password of the device is not registered, the process proceeds to a step S4-10, wherein only the basic information on the device necessary for displaying the device list screen is acquired using SLP. After that, the process proceeds to a step S4-11, wherein the device information acquired in the step S4-9 or S4-10 is registered in the database 403. It should be noted that operation of Phase 2b-2 performed when the Get button or the Update button shown in FIG. 19 is depressed is the same as that in the FIG. 17 flowchart illustrating the first search method, and description thereof is omitted.

The second search method is registered as a device search task at a security level 2, whereby device search is performed.

Next, a description will be given of a SNMPv3 device managed by the device monitoring section 40406 and the driver management section 40410.

The device 204 found by the first and the second search methods is a device which operates in the mode 3 (where only SNMPv3 operates) and whose password is not registered in the database 403. Device information on the device 204, such as an IP address, is displayed on the device list screen in a state in which the device 204 can be identified as a device.

However, it is impossible to make full use of the functions of the integrated device management application only by the searches performed by the first and second search methods.

For example, the device 204 cannot be included in devices managed by the device monitoring section 40406 and the driver management section 40410.

FIG. 21 is a view showing an example of display of device information monitored by the device monitoring section 40406. The filter function shown at a lower left location of the display screen cannot be applied to the device 204 found by the search (the term "filter function" is intended to mean a function of displaying a list of only devices narrowed down to those with a specific function. For example, when "color machine" is selected as a filter item, only color machines are displayed on the device list screen). This is because all option information is not acquired from the device. As filter functions, there are provided the respective items of Status, Product Type (MFP, LBP and BJ), Color Printing Possible, Maximum Sheet Size, Network Board Name, Comment, Paper Deck Equipped, Double-sided Printing Possible, and Scanning Possible. Further, as filter functions, there are provided the respective items of Stapling Possible, Saddle Stitching Possible, Punching Possible, Piercing Possible, Trimming Possible, Fax Equipped, Envelope Printing Possible, Feeder Equipped, Collating Possible, Holding Possible, Insertion Possible, Send Function Equipped, and so forth.

To acquire all option information, the Get button is depressed and a password is inputted. This makes it possible to cause the device 204 in the mode 3 to be included in the devices managed by the device monitoring section 40406, thereby making it possible to enhance the operability of the device management application used by the IT manager.

FIG. 22 is a view showing an example of display of device information managed by the driver management section 40410. Similarly to the case of the device monitoring section 40406, since the filter function cannot be used for the device 204 in the mode 3, the device 204 cannot be included in the devices managed by the driver management section 40410. By depressing the Get button, and acquiring information specially required by the driver management section 40410, such as PDL information and the device ID of the device 204, it is possible to cause the device 204 to be included in the managed devices.

Next, a description will be given of the device search task.

FIGS. 23 to 25 are views of examples of screens for generating device search tasks of the integrated device management application. FIG. 23 shows a screen for setting conditions for searching for devices. To search for SNMPv3 devices, a check box for searching for SNMPv3 devices is selected and a security level 1 or 2 is designated. When the security level 1 is designated, the first search method is executed. When the security level 2 is designated, the second search method is executed. FIG. 24 shows a screen for setting a task name, a scheduled time to execute the task, and an address for notification after termination of the task. FIG. 25 shows a screen for confirming details of the task. A device search task is registered using the above-mentioned three wizard screens. The task is executed by the task processing section 40404 of the integrated device management application, and the details of the task are notified to the device search section 40409. The device search section 40409 searches for devices according to the details of the task.

As described above, in the present embodiment, in the environment in which the SNMPv1 device and SNMPv3 device are mixed, it is possible to display device information as a list of items except for that of an IP address, which makes it easy to identify a device. Further, since the device filter function can be used, it is possible to reduce restriction on the functions of the integrated device management application.

This makes it possible to enhance the operability of the device management application used by the IT manager.

It should be noted that although in the above-described embodiment, the network management system is configured to have the server 101 as a management apparatus and the PC 100 as an information processing apparatus formed as separate apparatuses, by way of example, this is not limitative, but the network management system may be configured to have the server 101 and the PC 100 integrated into a unitary apparatus.

Further, it is to be understood that the present invention may also be realized by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-333749 filed Dec. 11, 2006, which is hereby incorporated by reference herein in its entirety.

What is claimed is:

1. A network management system that carries out a search for a device corresponding to SNMP (Simple Network Management Protocol) of a version, the system comprising:
    hardware;
    a selection unit configured to select whether or not another search for a device corresponding to SNMP of another version, which is different from the SNMP of the version, should be carried out, based on a user's instruction;
    a reception unit configured to receive an instruction for searching for devices on a network;
    an acquisition unit configured to acquire information from the device corresponding to the SNMP of the version and acquire information from the device corresponding to the SNMP of the another version in response to reception of the instruction by said reception unit, when said selection unit selects that the another search for the device corresponding to the SNMP of the another version should be carried out, and acquire the information from the device corresponding to the SNMP of the version without acquiring information from the device corresponding to the SNMP of the another version in response to reception of the instruction by said reception unit, when said selection unit selects that the another search for the device corresponding to the SNMP of the another version should not be carried out; and
    a display control unit configured to display the information acquired from the device corresponding to the SNMP of the version and the information acquired from the device corresponding to the SNMP of the another version, if acquired, on a screen,
    wherein each of said units is implemented, at least in part, by the hardware.

2. A network management system as claimed in claim 1, wherein, when said acquisition unit acquires the information from the device corresponding to the SNMP of the another version, said acquisition unit is configured to acquire the information from the device corresponding to the SNMP of the another version by using (a) the SNMP of the another version when a password based on the SNMP of the another version is registered, and (b) a predetermined protocol when the password based on the SNMP of the another version is not registered.

3. A network management system as claimed in claim 2, wherein the predetermined protocol is SLP (Service Location Protocol).

4. A network management system as claimed in claim 2, wherein the information acquired from the device using the predetermined protocol is restricted from the information acquired using the SNMP of the another version.

5. A network management system as claimed in claim 1, wherein said display control unit is configured to display, on the screen, respective device names of devices acquired based on the information acquired by said acquisition unit.

6. A network management system as claimed in claim 1, wherein the SNMP of the version is SNMPv1, and the SNMP of the another version is SNMPv3.

7. A network management system as claimed in claim 1, wherein said display control unit is configured to display operation buttons on the screen for acquiring additional device information.

8. A network management system as claimed in claim 7, wherein said display control unit is configured to display an input screen through which setting, updating, or both setting and updating of a password for the device occurs.

9. A network management system as claimed in claim 1, wherein said display control unit is configured to display, on the screen, a list of respective devices that acquire the information by said acquiring unit in a state in which SNMP versions are able to be discriminated.

10. A network management method for carrying out a search for a device corresponding to SNMP (Simple Network Management Protocol) of a version, the method comprising:
    a selection step of selecting whether or not another search for a device corresponding to SNMP of another version, which is different from the SNMP of the version, should be carried out, based on a user's instruction;
    a reception step of receiving an instruction for searching for devices on a network;
    an acquisition step of acquiring information from the device corresponding to the SNMP of the version and acquiring information from the device corresponding to the SNMP of the another version in response to reception of the instruction in said reception step, when said selection step selects that the another search for the device corresponding to the SNMP of the another version should be carried out, and acquiring the information from the device corresponding to the SNMP of the version without acquiring information from the device corresponding to the SNMP of the another version in response to reception of the instruction in said reception step, when said selection step selects that the another search for the device corresponding to the SNMP of the another version should not be carried out; and a display control step of displaying the information acquired from the device corresponding to the SNMP of the version and the information acquired from the device corresponding to the SNMP of the another version, if acquired, on a screen.

11. A management apparatus that carries out a search for a device corresponding to SNMP (Simple Network Management Protocol) of a version, the apparatus comprising:

hardware;

a selection unit configured to select whether or not another search for a device corresponding to SNMP of another version, which is different from the SNMP of the version, should be carried out, based on a user's instruction;

a reception unit configured to receive an instruction for searching for devices on a network;

an acquisition unit configured to acquire information from the device corresponding to the SNMP of the version and acquire information from the device corresponding to the SNMP of the another version in response to reception of the instruction by said reception unit, when said selection unit selects that the another search for the device corresponding to the SNMP of the another version should be carried out, and acquire the information from the device corresponding to the SNMP of the version without acquiring information from the device corresponding to the SNMP of the another version in response to reception of the instruction by said reception unit, when said selection unit selects that the another search for the device corresponding to the SNMP of the another version should not be carried out; and a display control unit configured to display the information acquired from the device corresponding to the SNMP of the version and the information acquired from the device corresponding to the SNMP of the another version, if acquired, on a screen, wherein each of said units is implemented, at least in part, by the hardware.

12. A management apparatus as claimed in claim 11, wherein, when said acquisition unit acquires the information from the device corresponding to the SNMP of the another version, said acquisition unit is configured to acquire the information from the device corresponding to the SNMP of the another version by using (a) the SNMP of the another version when a password based on the SNMP of the another version is registered, and (b) a predetermined protocol when the password based on the SNMP of the another version is not registered.

13. A management apparatus as claimed in claim 12, wherein the predetermined protocol is SLP (Service Location Protocol).

14. A management apparatus as claimed in claim 12, wherein the information acquired from the device using the predetermined protocol is restricted from the information acquired using the SNMP of the another version.

15. A management apparatus as claimed in claim 11, wherein said display control unit is configured to display, on the screen, respective device names of devices acquired based on the information acquired by said acquisition unit.

16. A management apparatus as claimed in claim 11, wherein the SNMP of the version is SNMPv1, and the SNMP of the another version is SNMPv3.

17. A management apparatus as claimed in claim 11, wherein said display control unit is configured to display operation buttons on the screen for acquiring additional device information.

18. A management apparatus as claimed in claim 17, wherein said display control unit is configured to display an input screen through which setting, updating, or both setting and updating of a password for the device occurs.

19. A management apparatus as claimed in claim 11, wherein said display control unit is configured to display, on the screen, a list of respective devices that acquire the information by said acquiring unit in a state in which SNMP versions are able to be discriminated.

* * * * *